(12) United States Patent
Gilmutdinov et al.

(10) Patent No.: US 10,349,005 B2
(45) Date of Patent: Jul. 9, 2019

(54) TECHNIQUES FOR FRAME REPETITION CONTROL IN FRAME RATE UP-CONVERSION

(71) Applicant: INTEL CORPORATION, Santa Clara, CA (US)

(72) Inventors: Marat Gilmutdinov, Saint-Petersburg (RU); Anton Veselov, Saint-Petersburg (RU)

(73) Assignee: INTEL CORPORATION, Santa Clara, CA (US)

( * ) Notice: Subject to any disclaimer, the term of this patent is extended or adjusted under 35 U.S.C. 154(b) by 23 days.

(21) Appl. No.: 15/116,768

(22) PCT Filed: Feb. 4, 2014

(86) PCT No.: PCT/IB2014/000377
§ 371 (c)(1),
(2) Date: Aug. 4, 2016

(87) PCT Pub. No.: WO2015/118370
PCT Pub. Date: Aug. 13, 2015

(65) Prior Publication Data
US 2016/0353054 A1 Dec. 1, 2016

(51) Int. Cl.
*H04N 7/01* (2006.01)
*G06T 7/13* (2017.01)
*G06T 7/174* (2017.01)

(52) U.S. Cl.
CPC ............ *H04N 7/0142* (2013.01); *G06T 7/13* (2017.01); *G06T 7/174* (2017.01); *H04N 7/014* (2013.01);
(Continued)

(58) Field of Classification Search
CPC .... H04N 7/0142; H04N 7/0127; H04N 7/014; G06T 7/13; G06T 7/174; G06T 2207/10016; G06T 2207/10024
(Continued)

(56) References Cited

U.S. PATENT DOCUMENTS 6,480,632 B2 11/2002 Martins et al.
8,861,894 B2 * 10/2014 Rastogi ..................... G06T 5/00
348/441
(Continued)

FOREIGN PATENT DOCUMENTS

GB 2279531 1/1995

OTHER PUBLICATIONS

International Search Report, dated Feb. 10, 2014, Application No. PCT/IB2014/000377, Filed Date: Feb. 4, 2014, pp. 7.
(Continued)

*Primary Examiner* — Jefferey F Harold
*Assistant Examiner* — Omer Khalid

(57) ABSTRACT

Various embodiments are generally directed to techniques for determining whether to use an interpolated frame or repeat a base frame in up-converting the frame rate of a base video stream to generate an up-converted video stream. A device to up-convert a frame rate includes an analysis component to analyze a pair of temporally adjacent base frames and a motion vector associated with movement of an object between the pair of base frames to determine a degree of visual artifacts involving an edge of the object in an interpolated frame, and a selection component to compare the degree of visual artifacts to a threshold and select the interpolated frame for insertion between the preceding base frame and the following base frame in up-converting a frame
(Continued)

rate of the base video stream to generate an up-converted video stream based on the comparison. Other embodiments are described and claimed.

7 Claims, 14 Drawing Sheets

(52) U.S. Cl.
CPC . *H04N 7/0127* (2013.01); *G06T 2207/10016* (2013.01); *G06T 2207/10024* (2013.01)

(58) Field of Classification Search
USPC .......................................... 382/282
See application file for complete search history.

(56) References Cited

U.S. PATENT DOCUMENTS

| 2007/0242748 A1* | 10/2007 | Mahadevan | H04N 19/44 |
| | | | 375/240.14 |
| 2009/0208123 A1* | 8/2009 | Doswald | H04N 19/132 |
| | | | 382/236 |
| 2011/0141349 A1 | 6/2011 | Albuz et al. | |
| 2011/0294544 A1* | 12/2011 | Liang | H04N 21/2353 |
| | | | 455/556.1 |
| 2014/0010307 A1 | 1/2014 | Gilmutdinov et al. | |

OTHER PUBLICATIONS

A. Pelagotti, et al., "High quality picture rate up-conversion for video on TV and PC", Dec. 31, 1999, TV and PC, Proc. Philips Conf. Digital Signal Processing, Philips Research Laboratories, pp. 7.

Choi B-T, et al. "New frame rate up-conversion using bi-directional motion estimation", IEEE Transactions on consumer electronics, IEEE Service Center, New York, NY, US, vol. 46, No. 3, Aug. 1, 2000, pp. 603-609.

Mertens, M. & Haan, G., "A block-based motion estimator capable of handling occlusions", Nov. 30, 2000, IAPR Workshop on Machine Vision Applications, pp. 529-530, pp. 1-4, retrieved from es.ele.tue. nl~dehaan/pdf62_MVA00_tokyo.pdf.

* cited by examiner

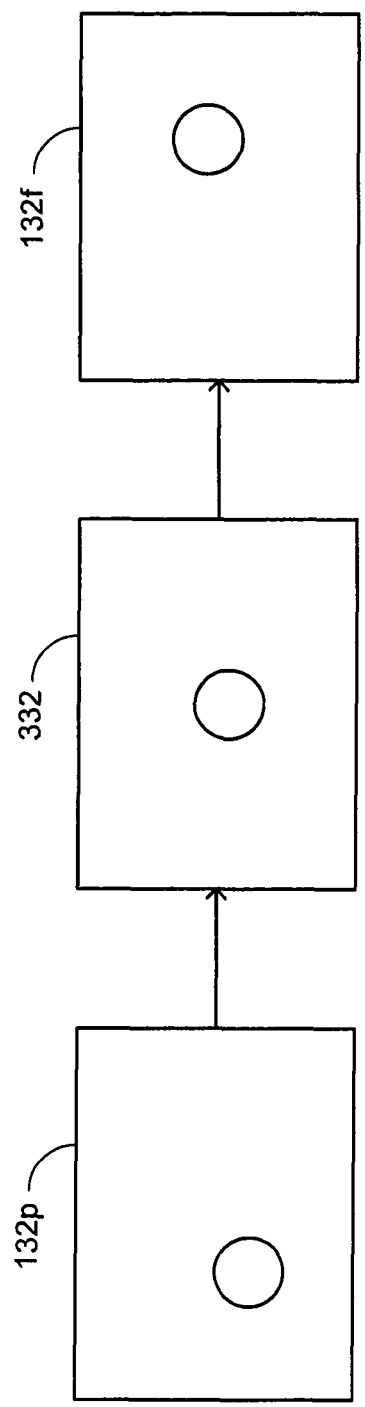

TECHNIQUES FOR FRAME REPETITION CONTROL IN FRAME RATE UP-CONVERSION

CROSS-REFERENCE TO RELATED APPLICATIONS

This application is a national stage application claiming the benefit of and priority to International Application No. PCT/IB2014/000377 entitled "Techniques for Frame Repetition Control in Frame Rate Up-Conversion" filed Feb. 4, 2014, which is hereby incorporated by reference in its entirety.

BACKGROUND

The increasingly commonplace use of flat panel displays operated at ever high refresh rates has spurred a corresponding increasing use of frame rate up-conversion to increase the frame rates of video streams of frames of motion videos to match those refresh rates. Various forms of video interpolation have been devised to generate the additional frames required in such up-conversions.

Earlier forms of video interpolation largely employed various averaging techniques to generate pixel color values for the pixels of interpolated frames from corresponding pixels of adjacent base frames. It was expected that the motion of objects between adjacent base frames could be accommodated by such averaging techniques. However, increases in rates of motion of objects in typical motion videos coupled with increases in pixel resolution in both the motion videos and the displays have made such approaches less desirable due to resulting visual artifacts.

Thus, current forms of video interpolation employ various techniques to specifically detect and characterize the motion of objects between adjacent base frames. In particular, changes in position of the location of pixel color values determined to represent moving objects are detected between adjacent base frames, and motion vectors are derived to describe such changes. Those motion vectors are then employed to determine correct positions among the pixels of interpolated frames at which to locate those pixel color values in an effort to correctly position the moving objects in the interpolated frames.

However, errors can occur in such approaches to video interpolation, including errors in which areas of relatively closely matching pixel color values are incorrectly determined to represent moving objects, in which other pixel color values that represent moving objects are not determined to represent moving objects, and/or in which motion vectors inaccurately indicate direction and/or magnitude of movement. Such errors can cause various visual artifacts in the interpolated frames, including lack of inclusion of some or all of a moving object, inclusion of duplicate portions of a moving object, an apparent stretching of a moving object, an apparent breaking apart of a moving object, etc.

Given the often significantly high frame rates to which motion videos are up-converted, the visual presentation of some of such artifacts may go unnoticed. However, the human visual system (HVS) makes considerable use of edge detection as part of identifying objects such that the visual presentation of artifacts that add and/or remove edges that an object would ordinarily have is often readily noticed and can be very distracting.

BRIEF DESCRIPTION OF THE DRAWINGS

FIGS. 4A-E each illustrate an example of generating an interpolated frame.

DETAILED DESCRIPTION

Figure 1:
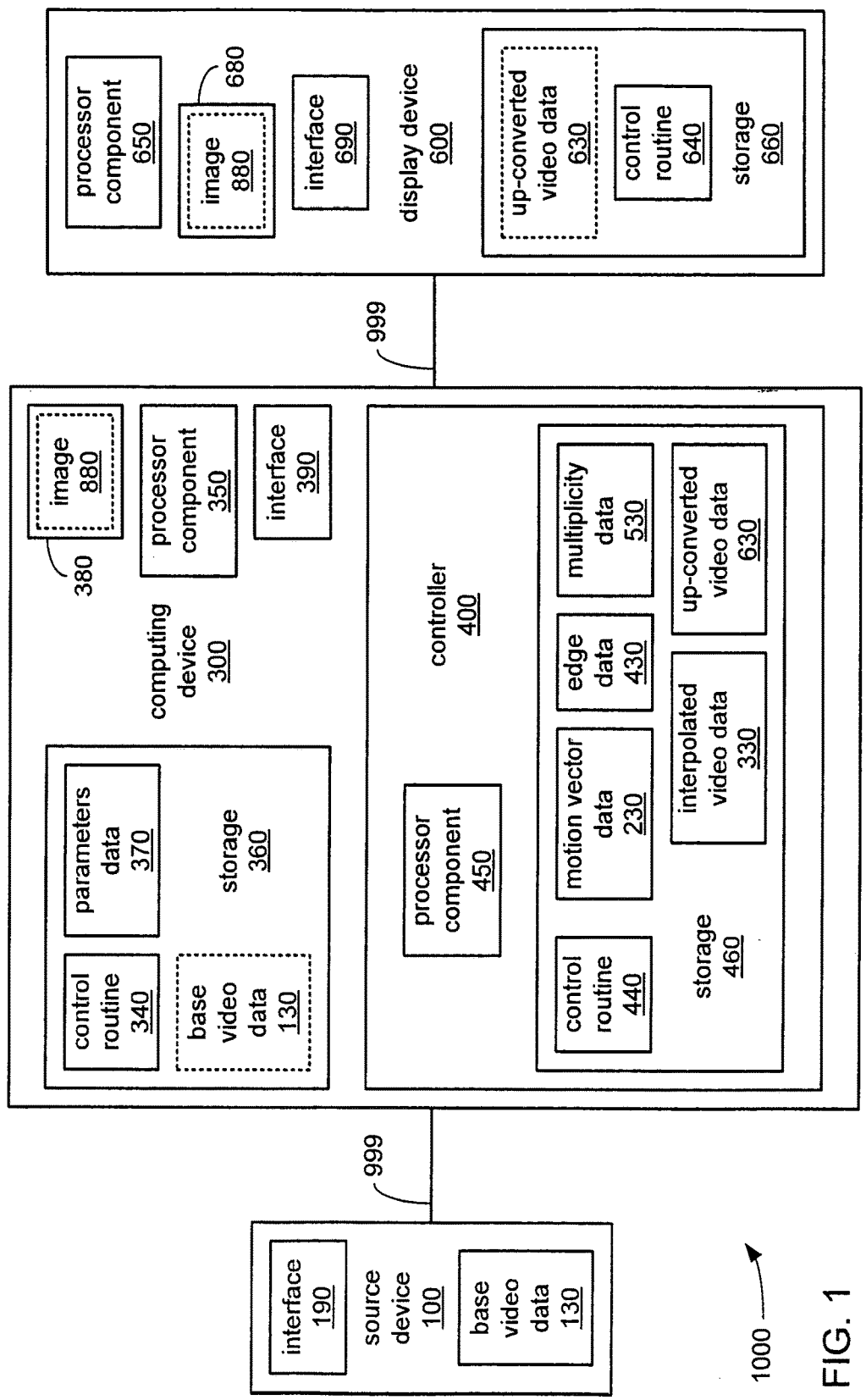
FIG. 1 illustrates an embodiment of a video processing system.

Various embodiments are generally directed to techniques for determining whether to use an interpolated frame or repeat one of the base frames from which the interpolated frame may be derived in up-converting the frame rate of a base video stream of frames of a motion video to generate an up-converted video stream. The base frames from which the interpolated frame may be derived and the motion vectors representing movement of objects determined to occur between those base frames are analyzed together to determine whether visual presentation of the interpolated frame would entail visual presentation of visual artifacts that are too distracting given the characteristics of the HVS. If the degree of such distraction is determined to be beneath a predetermined threshold, then the interpolated frame is used in the up-converted video stream. However, if the degree of such distraction is too great, then the base frame preceding or following the temporal position to be occupied by the interpolated frame in the up-converted video stream is repeated and used at that position instead of the interpolated frame.

In performing the up-conversion in frames rates from the base video stream to the up-converted video stream, a pair of temporally adjacent base frames in the base video stream are analyzed by an interpolating component to detect objects that move between them using any of a variety of detection techniques. Where such moving objects are determined to be present, motion vectors indicating the direction of movement, extent of movement and/or which pixels are associated with such movement are generated.

The interpolating component may then employ the motion vectors to generate an interpolated frame to be inserted temporally between the two base frames of the pair of temporally adjacent base frames as part of generating the up-converted video stream. The interpolating component may employ any of a variety of algorithms to generate the interpolated frame based at least in part on the motion vectors. However, in some embodiments, the interpolating component may await receipt of a signal indicating whether that interpolated frame will be so inserted before employing processing and/or storage resources to generate it.

Each of the two base frames is analyzed along with the motion vectors to determine the multiplicity of use of the pixel color values of each of their pixels. As familiar to those skilled in the art, the use of motion vectors in generating an interpolated frame often results in pixel color values of some pixels of a base frame being used more than once in providing the pixel color values of the pixels of the interpolated frame and/or pixel color values of other pixels of a base frame not being used at all. The pixels of a base frame of which the pixel color values are not used at all define one or more regions that are often referred to as "holes" in that base frame. The pixels of a base frame of which the pixel color values are used more than once define one or more regions that are often referred to as "collisions" in that base frame.

Each of the two base frames is also analyzed to identify pixels coinciding with edges at which there is a relatively high degree of change in pixel color values representing a relatively high degree of change in color and/or brightness. Any of a variety of algorithms may be employed to identify those edges.

Within each of the two base frames, the locations of any edges, holes and/or collisions are analyzed to identify quantities of pixels at which edges coincide with holes and quantities of pixels at which edges coincide with collisions. These quantities are then employed in a calculation to derive a value indicative of the degree to which distracting visual artifacts that involve edges of a moving object are or will be present in the interpolated frame. That value is then compared to the predetermined threshold to determine whether the interpolated frame will be used by being temporally inserted between the two base frames in the up-converted video stream, or whether one of the two base frames will be repeated in the up-converted video stream. In embodiments in which generation of the interpolated frame by the interpolating component is conditioned on this determination, the interpolating component may be signaled with an indication of this determination.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of an embodiment of a video processing system 1000 incorporating one or more of a source device 100, a computing device 300 and a display device 600. In the video processing system 1000, the frame rate of a base stream of frames of base video data 100 representing motion video imagery 880 is up-converted by the computing device 300 to generate an up-converted stream of frames of up-converted video data 630 that also represents the motion video imagery 880, but at a higher frame rate. The base video data 100 may be received by the computing device 300 from the source device 100. The up-converted video data 630 may be stored within the computing device 300 and visually displayed by the computing device 300, and/or transmitted to the display device 600 to be visually presented by the display device 600. Each of these computing devices may be any of a variety of types of computing device, including without limitation, a desktop computer system, a data entry terminal, a laptop computer, a netbook computer, a tablet computer, a handheld personal data assistant, a smartphone, smart glasses, a smart wristwatch, a digital camera, a body-worn computing device incorporated into clothing, a computing device integrated into a vehicle (e.g., a car, a bicycle, a wheelchair, etc.), a server, a cluster of servers, a server farm, etc.

As depicted, these computing devices 100, 300 and 600 exchange signals conveying base and up-converted video data representing the motion video 880 and/or related data through a network 999. However, one or more of these computing devices may exchange other data entirely unrelated to the motion video 880 with each other and/or with still other computing devices (not shown) via the network 999. In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In various embodiments, the source device 100 (if present) incorporates an interface 190 to couple the source device 100 to the computing device 300 to provide the computing device 300 with the base video data 130. As depicted, the interface 190 may couple the source device 100 to the computing device 300 through the same network 999 as couples the computing device 300 to the display device 600. However, in other embodiments, the source device 100 may be coupled to the computing device 300 in an entirely different manner. At least a portion of the base video data 130 may have been created via the source device 100, e.g., where the source device 100 either is or incorporates a camera such that the base video data 100 includes representations of the frames of the motion video 880 captured by the source device 100. Alternatively or additionally, at least a portion of the base video data 130 may simply be stored on the source device 100 for later conveyance to the computing device 300 following its receipt from yet another device.

In various embodiments, the computing device 300 incorporates one or more of a processor component 350, a storage 360, a controller 400, a display 380 and an interface 390 to couple the computing device 300 to the network 999. The storage 360 stores one or more of a control routine 340, the base video data 130 and parameters data 370. The controller 400 incorporates one or more of a processor component 450 and a storage 460. The storage 460 stores one or more of a control routine 440, motion vector data 230, interpolated video data 330, edge data 430, multiplicity data 530 and the up-converted video data 630.

The control routine 340 incorporates a sequence of instructions operative on the processor component 350 in its role as a main processor component of the computing device 300 to implement logic to perform various functions. In executing the control routine 340 in some embodiments, the processor component 350 may receive the base video data 130 representing the motion video 880 from the source device 100, and may store at least a subset thereof in the storage 360. It should be noted that the base video data 130 may be stored in the storage 360 for a considerable amount of time before any use is made of it, including up-conversion, visual presentation and/or transmission thereof. Where the base video data 130 is in compressed form, the processor component 350, in executing the control routine 340, may decompress it. Where the base video data 130 requires color space conversion in preparation for being up-converted, visually presented and/or transmitted, the processor component 350, in executing the control routine 340, may convert its color space. The processor component 350 then provides the base video data 130 to the controller 400 to be compressed.

The control routine 440 incorporates a sequence of instructions operative on the processor component 450 in its role as a controller processor component of the controller 400 of the computing device 300 to implement logic to perform various functions. In executing the control routine 440, the processor component 450 up-converts the frame rate of the base video data 130 representing the motion video 880 to generate the up-converted video data 630 that also represents the motion video 880, but at a higher frame rate.

Figure 3:
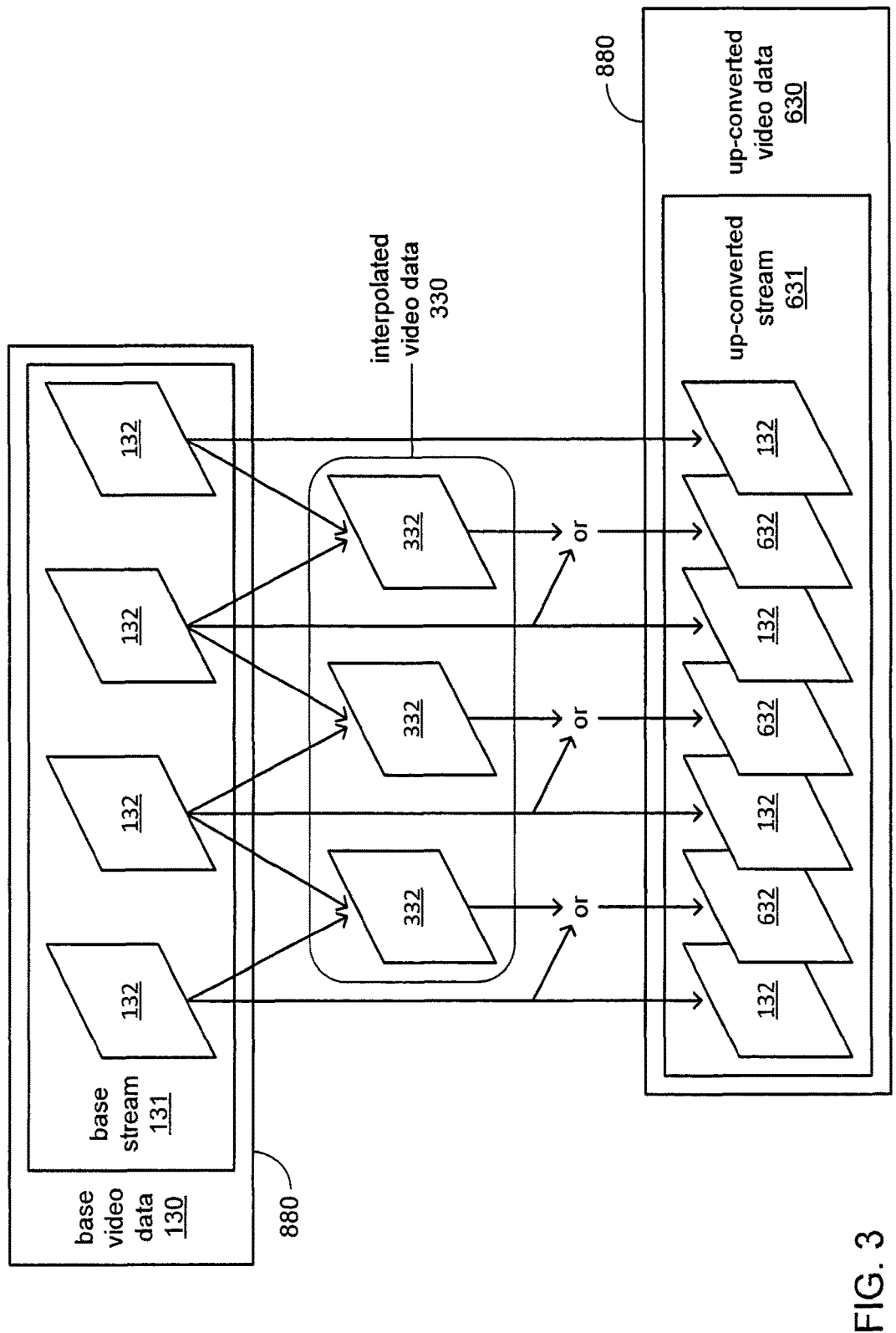
FIG. 3 illustrates an embodiment of up-converting a frame rate of a motion video.

FIG. 3 depicts an example embodiment of up-converting the frame rate of a base stream 131 of the base video data 130 to generate a corresponding up-converted stream 631 of the up-converted video data 630 by the processor component 450 in executing of at least a portion of the control routine 440. As depicted, the base stream 131 is made up of a series of base frames 132 arranged in a temporal order that represents the motion video 880 at a base frame rate. The up-converted stream 631 includes the same base frames 132 in the same temporal order, but between each pair of adjacent base frames 132 is inserted an up-conversion frame 632 to give the up-converted stream 631 an up-converted frame rate that is double the base frame rate.

As further depicted, the processor component 450 may employ each pair of adjacent base frames 132 to at least partly perform the generation of an interpolated frame 332 of the interpolated video data 330. The processor component 450 performs an analysis to determine the degree to which there are or will be distracting visual artifacts that involve edges of one or more moving object in the interpolated frame 332. The processor component 450 then determines whether to use that interpolated frame 332 or to repeat one of the base frames 132 from which that interpolated frame 332 was derived to provide the corresponding up-conversion frame 632 based on whether that degree exceeds a predetermined threshold. The predetermined threshold may be retrieved by the processor component 450 from the parameters data 370, which may be received from the source device 100 and/or may be provided to the controller 400 by the processor component 350.

It should be noted that this depiction of an example of doubling a frame rate is but one example of frame rate up-conversion, and should not be taken as limiting. More specifically, other embodiments are possible in which other ratios of frame rates exist between the base stream 131 and the up-converted stream 631. In particular, embodiments are possible in which differing quantities of up-conversion frames 632 may be inserted between the base frames 132 of adjacent pairs of the base frames 132 in the up-converted stream 631.

Figure 4C:
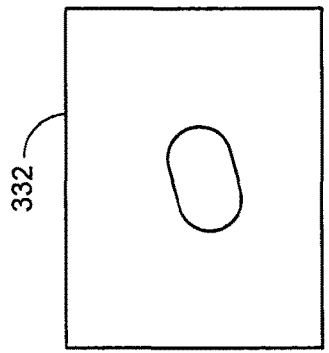

FIGS. 4A through 4E depict examples of possible results of generating an interpolated frame 332 of the interpolated video data 330 from a pair of the base frames 132 of the base video data 130, specifically, a base frame $132p$ that precedes the temporal position of the interpolated frame 332 and another base frame $132f$ that follows that temporal position. FIG. 4A depicts this temporal order where an object (e.g., a ball or other object with a circular outline defined by its associated edges) moves between two different positions in the temporal progression from the base frame $132p$ to the base frame $132f$. It should be noted that these example base frames $132p$ and $132f$, as well as each of the examples of the interpolated frame 332 generated therefrom, are deliberately highly simplified examples presented herein to facilitate discussion and understanding, and should not be taken as limiting what is presented herein to such simplistic situations. It is to be understood that more typical examples frames of the motion video 880 may contain far more complex visual content that may well include multiple moving objects that may move in multiple differing directions.

FIG. 4A depicts an example of what may be deemed a successful generation of the interpolated frame 332 from the base frames $132p$ and $132f$. Specifically, the ball is depicted in the interpolated frame 332 at a location along a path between its locations in each of the base frames $132p$ and $132f$ with no (or relatively few) visual artifacts that involve the edges of the ball. More precisely, the shape of the ball, as defined by its edges, is at least apparently unchanged. There has been no failure to visually present the ball such that all of its edges are missing, the ball has not been divided into separately visually presented portions such that there are more edges than there should be, and the shape of the ball has not been distorted such that there is a different quantity of edges than there should be and/or edges at incorrect positions relative to each other. Despite the sensitivity of the human visual system (HVS) to changes in edges as a result of its reliance on edge detection to identify objects, the relative lack of change to the edges that define the ball in the interpolated frame 332 will likely present little or no distraction to a typical HVS as the preceding base frame $132p$, the interpolated frame 332 and the following base frame $132f$ are viewed in temporal order.

In contrast, each of FIGS. 4B-E depicts an example of a less successful generation of the interpolated frame 332 from the base frames 132p and 132f. In each of these examples, the interpolation to generate the interpolated frame 332 has introduced visual artifacts that involve the edges that define the ball. More specifically, the quantity of edges and/or the relative positions of edges of the ball is errantly altered in the visual presentation of the ball in each of these examples of the interpolated frame 332 to a degree that is likely distracting to a typical HVS during viewing. It should be noted that the depiction of the examples of FIGS. 4B-E are not intended to provide an exhaustive presentation of every possible visual artifact involving edges of a moving object that may arise from interpolation.

Figure 4E:
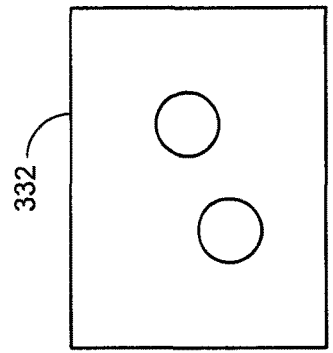
Figure 4B:
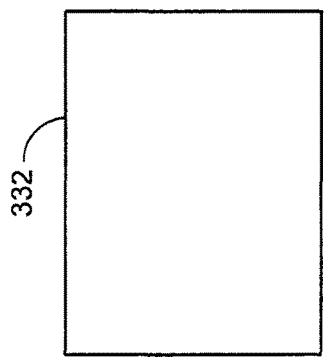

Turning to FIG. 4B, the ball is entirely missing from this example of the interpolated frame 332. As a result, all of the edges that define the ball are missing, and this is likely to be distracting as the preceding base frame 132p, the interpolated frame 332 and the following base frame 132f are viewed in temporal order by a typical HVS.

Turning to FIG. 4C, the ball has been stretched in an orientation that follows the path from its position in the preceding base frame 132p to its position in the following base frame 132f. This change in shape corresponds to an increase in the overall length of the edges that define the ball, as well as corresponding to changes in position of at least some edges relative to others, both of which are likely to be distracting when viewed by a typical HVS.

Figure 4D:
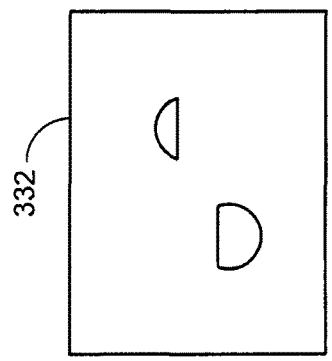

Turning to FIG. 4D, the ball has been divided into two pieces, one generally at the location of the ball in the preceding base frame 132p and the other generally at the location of the ball in the following base frame 132f. Such a division of the ball into multiple pieces introduces additional edges at positions at which no edges should be present such that the shape of the ball is effectively altered. Further, the overall length of the edges defining the ball is likely to have been changed. Such changes in the edges are likely to be distracting when viewed by a typical HVS.

Turning to FIG. 4E, the ball has been replicated such that it is visually presented at both its location in the preceding base frame 132p and its location in the following base frame 132f. Such a replication of the ball effectively doubles the quantity of edges, which is likely to be distracting when viewed by a typical HVS.

Figure 5:
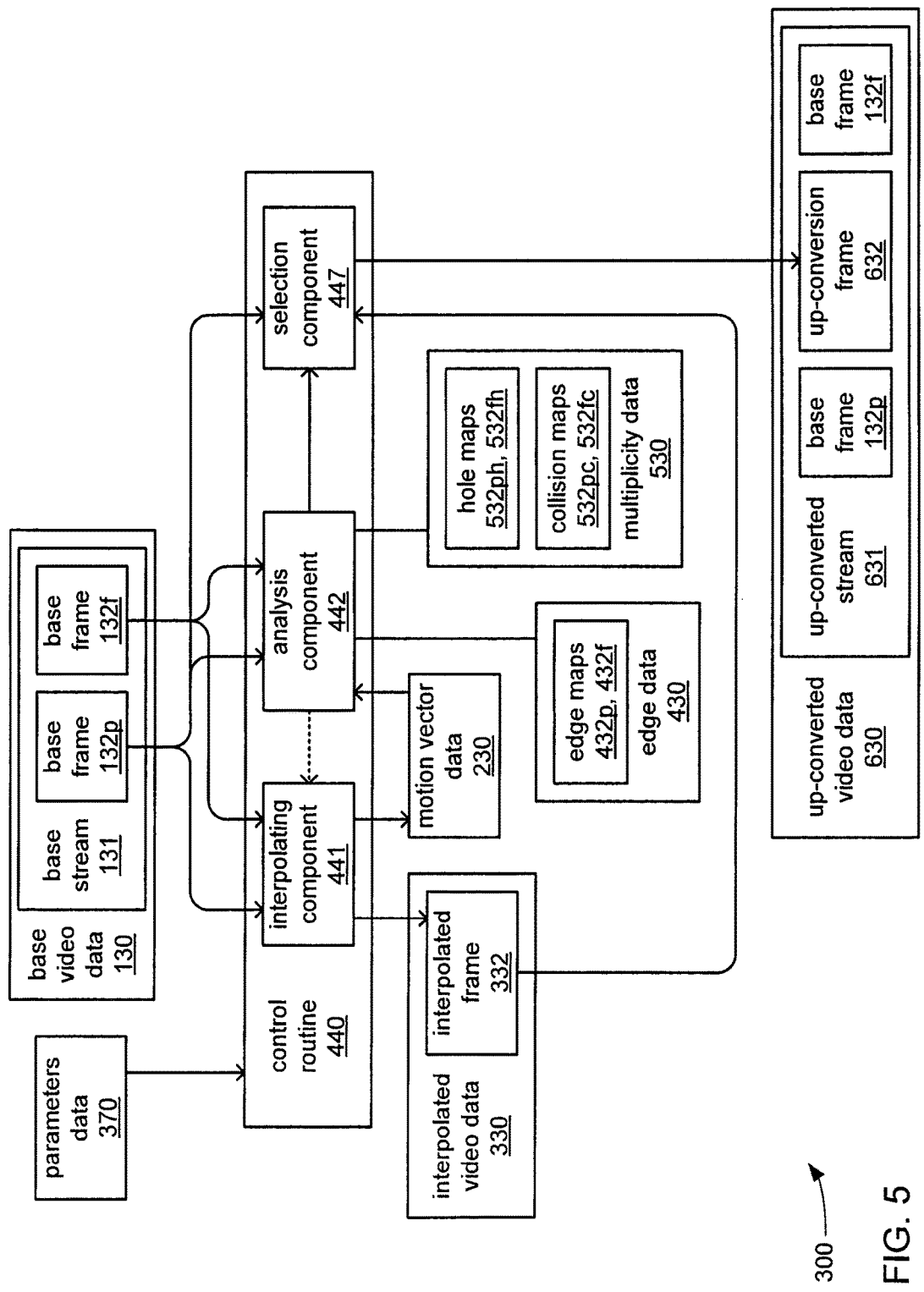
FIG. 5 illustrates an embodiment of selecting an up-conversion frame.

As has been discussed, to address the possibility of occurrences of visual artifacts, such as those depicted in FIGS. 4B-E in one or more of the interpolated frames 332 of the interpolated video data 330, the processor component 450 performs an analysis to determine whether to use each of the interpolated frames 332 or to repeat one of the base frames 132 from which each of the interpolated frames 332 is derived. FIG. 5 depicts an example embodiment of such analysis and determination arising from execution of the control routine 440 in greater detail. As depicted, the control routine 440 may incorporate one or more of an interpolating component 441, an analysis component 442 and a selection component 447.

In executing the interpolating component 441, the processor component 450 analyzes an adjacent pair of the base frames 132 of the base stream 131 of the base video data 130 to identify objects that move in the temporal progression between the pair of base frames 132. More specifically, the analysis involves one of the base frames designated a preceding base frame 132p and another of the base frames designated a following base frame 132f. The processor component 450 then generates bilateral motion vectors indicative of the direction and/or extent of the movement of the identified moving object(s) from the base frame 132p to the base frame 132f, as well as which pixels in each of the base frames 132p and 132f are associated with such movement. Any of a variety of algorithms may be employed to generate the motion vectors, including and not limited to the bi-directional motion estimation technique described by Choi et al in their paper "New Frame Rate Up-Conversion Using Bi-Directional Motion Estimation", IEEE Transactions on Consumer Electronics, 2000, vol. 46, pages 603-609. The processor component 450 stores such motion vectors as the motion vector data 230.

In further executing the interpolating component 441, the processor component 450 may use those motion vectors to generate one of the interpolated frames 332 from the base frames 132p and 132f that corresponds to a temporal position between these two base frame 132p and 132f in the up-converted stream 631 of the up-converted video data 630. In some embodiments, the processor component 450 may so generate this interpolated frame 332 without first awaiting an indication of whether or not this interpolated frame 332 will be used in the up-converted stream 631. In other embodiments, the processor component 450 may condition the generation of this interpolated frame 332 on such an indication.

In executing the analysis component 442, the processor component 450 analyzes the base frames 132p and 132f in conjunction with those same motion vectors of the motion vector data 230 to determine whether the interpolated frame 332 includes (or will include, if generated) visual artifacts involving edges of one or more moving objects. An advantage of performing such analysis based on the motion vectors and the base frames 132p and 132f, rather than based on the interpolated frame 332, is that generation of the interpolated frame 332 can be delayed until it is known whether or not the interpolated frame 332 will be used. Thus, use of processing, storage and/or power resources to generate the interpolated frame 332 may be entirely avoided if it is determined (as a result of the analysis) that the interpolated frame 332 will not be used.

The processor component 450 analyzes each of the base frames 132p and 132f to identify pixels coinciding with edges defined by a relatively high degree of change in pixel color values representing a relatively high degree of change in color and/or brightness. Any of a variety of algorithms may be employed to identify such edges, including and not limited to gradient-based approaches analyzing degrees of difference between pixel color values of adjacent pixels, such as a Sobel operator. The processor component 450 may generate and store in the edge data 430 separate edge maps 432p and 432f for each of the base frames 132p and 132f, respectively, that indicate which pixels in each of these base frames correspond to the locations of such identified edges.

The processor component 450 analyzes each of the motion vectors of the motion vector data 230 to determine the multiplicity with which the pixel color values of each pixel in each of the base frames 132p and 132f is used (or will be used) in generating pixel color values for pixels of the interpolated frame 332. Again, these motion vectors are bilateral motion vectors indicative of movement of identified moving object(s) from the base frame 132p to the base frame 132f. The pixels of a base frame of which the pixel color values are not used in providing a pixel color value for any pixel of the interpolated frame 332 are determined to have a multiplicity of zero. Such pixels are said to define one or more regions made up of one or more pixels in that base frame referred to as "holes" of that base frame. Correspondingly, the pixels of a base frame of which the pixel color values are used in providing pixel color values for more than one pixel of the interpolated frame 332 are determined to have a multiplicity greater than one. Such pixels are said to define one or more regions made up of one or more pixels in that base frame referred to as "collisions" of that base frame. The processor component 450 may generate and store in the multiplicity data 530 separate hole maps 532*ph* and 532*fh* (maps of pixels having a multiplicity of zero), and separate collision maps 532*pc* and 532*fc* (maps of pixels having a multiplicity greater than one) for each of the base frames 132*p* and 132*f*, respectively, that indicate which pixels in each of these base frames are part of a region of one or more pixels defining a hole or a collision. Stated differently, the processor component 450 may generate indications of which pixels of each of the base frames 132*p* and 132*f* have a multiplicity value other than one.

For each of the base frames 132*p* and 132*f*, the processor component 450 compares the edge map to each of the hole and collision maps to derive the quantities of pixels at locations where an edge coincides with a hold or a collision. Specifically, the edge map 432*p* is compared to the hole map 532*ph* and the collision map 532*pc* for the base frame 132*p*, and the edge map 432*f* is compared to the hole map 532*fh* and the collision map 532*fc* for the base frame 132*f*. For each of the base frames 132*p* and 132*f*, those quantities of pixels at such locations are summed to generate separate criterion values for each of the base frames 132*p* and 132*f*. The greater of these two criterion values is then compared to a predetermined threshold to determine whether the interpolated frame 332 is to be used as the up-conversion frame 632 in the temporal position between the base frames 132*p* and 132*f* in the up-converted stream 631, or one of the base frames 132*p* and 132*f* is to be repeated at that temporal position as the up-conversion frame 632. Stated differently, the greater of the sums of the quantities of pixels located in each of the base frames 132*p* and 132*f* where edges coincide with holes or with collisions is compared to a threshold to determine if there is (or would be) too great a degree of visual artifacts involving edges of moving objects in the interpolated frame 332 for the interpolated frame 332 to be used.

In some embodiments, the quantity $Q_{eh}$ of pixels at locations at which holes and edges coincide in each of the base frames 132*p* and 132*f* may be derived as follows:

$$Q_{eh} = \sum_{i=1}^{H}\sum_{j=1}^{W}(\text{edge}_{i,j} \cap (\text{multiplicity}_{i,j} = 0))$$

This quantity $Q_{eh}$ represents the sum of pixels in a base frame of height H and width W at all locations (i,j) at which there is an edge and at which the multiplicity of use of the pixel color value of the pixel in generating an interpolated frame is 0 (e.g., where the pixel color value is not used), where i=1→H, and where j=1→W. Similarly, the quantity $Q_{ec}$ of pixels at locations at which collisions and edges coincide in each of the base frames 132*p* and 132*f* may be derived as follows:

$$Q_{ec} = \sum_{i=1}^{H}\sum_{j=1}^{W}(\text{edge}_{i,j} \cap (\text{multiplicity}_{i,j} > 1))$$

This quantity $Q_{ec}$ represents the sum of pixels in the same base frame of height H and width W at all locations (i,j) at which there is an edge and at which the multiplicity of use of the pixel color value of the pixel in generating the same interpolated frame is greater than 1 (e.g., the pixel color value is used more than once), where i=1→H, and where j=1→W.

Following such derivation of the quantities $Q_{eh}$ and $Q_{ec}$ for each of the base frames 132*p* and 132*f*, a criterion value C for each of these base frames may be derived as follows:

$$C = \frac{\alpha(Q_{eh}) + \beta(Q_{ec})}{\sum_{i=1}^{H}\sum_{j=1}^{W}(\text{edge}_{i,j})}$$

This criterion value C represents the sum of quantity $Q_{eh}$ multiplied by α and the quantity $Q_{ec}$ multiplied by β, where the sum is then divided by the quantity of pixels in the same base frame of height H and width W at all locations (i,j) at which there is an edge, where i=1→H, and where j=1→W. The greater of the criterion value C of the base frame 132*p* and the criterion value C of the base frame 132*f* is then selected and compared to the predetermined threshold to determine whether the interpolated frame 332 should be used as the up-conversion frame 632.

The multiplying factors α and β, as well as the predetermined threshold, may all be specified in the parameters data 370. The multiplying factors α and β, and the predetermined threshold may be derived through experimentation to determine relative weights to be given to each of the quantities $Q_{eh}$ and $Q_{ec}$, as well as to determine what threshold separates a degree of artifacts involving edges of a moving object in a frame is too distracting to a typical HVS. In other words, experiments may be conducted to determine whether visual artifacts involving an errant lack of visual presentation of edges of moving objects is more or less distracting to a typical HVS than visual artifacts involving an errant visual presentation of more edges of moving objects than should be visually presented. The multiplying factors α and β may then be selected to reflect the results of such experimentation to enhance the accuracy with which interpolated frames 332 are determined to have to great a degree of visual artifacts involving edges of moving objects to be used. In some embodiments, the multiplying factors α and β may be specified per motion video or per category of motion video as a result of experimentation per motion video or per category of motion video, and the predetermined threshold may be specified for a relatively wide variety of motion videos of multiple categories.

In some embodiments, an indication of whether the interpolated frame 332 is to be used is conveyed from the analysis component 442 to the interpolating component 441 to implement the determination of whether or not the interpolated frame 332 is to be used. As previously discussed, this may control whether or not the interpolated frame 332 is actually generated. In other embodiments, the processor component 450, in executing the selection component 447 may copy the interpolated frame 332 from the interpolated video data 330 or may copy one of the base frames 132*p* or 132*f* into the up-converted stream 631 of the up-converted video data 630 as the up-conversion frame 632 to implement the determination of whether or not the interpolated frame 332 is to be used.

Figure 6:
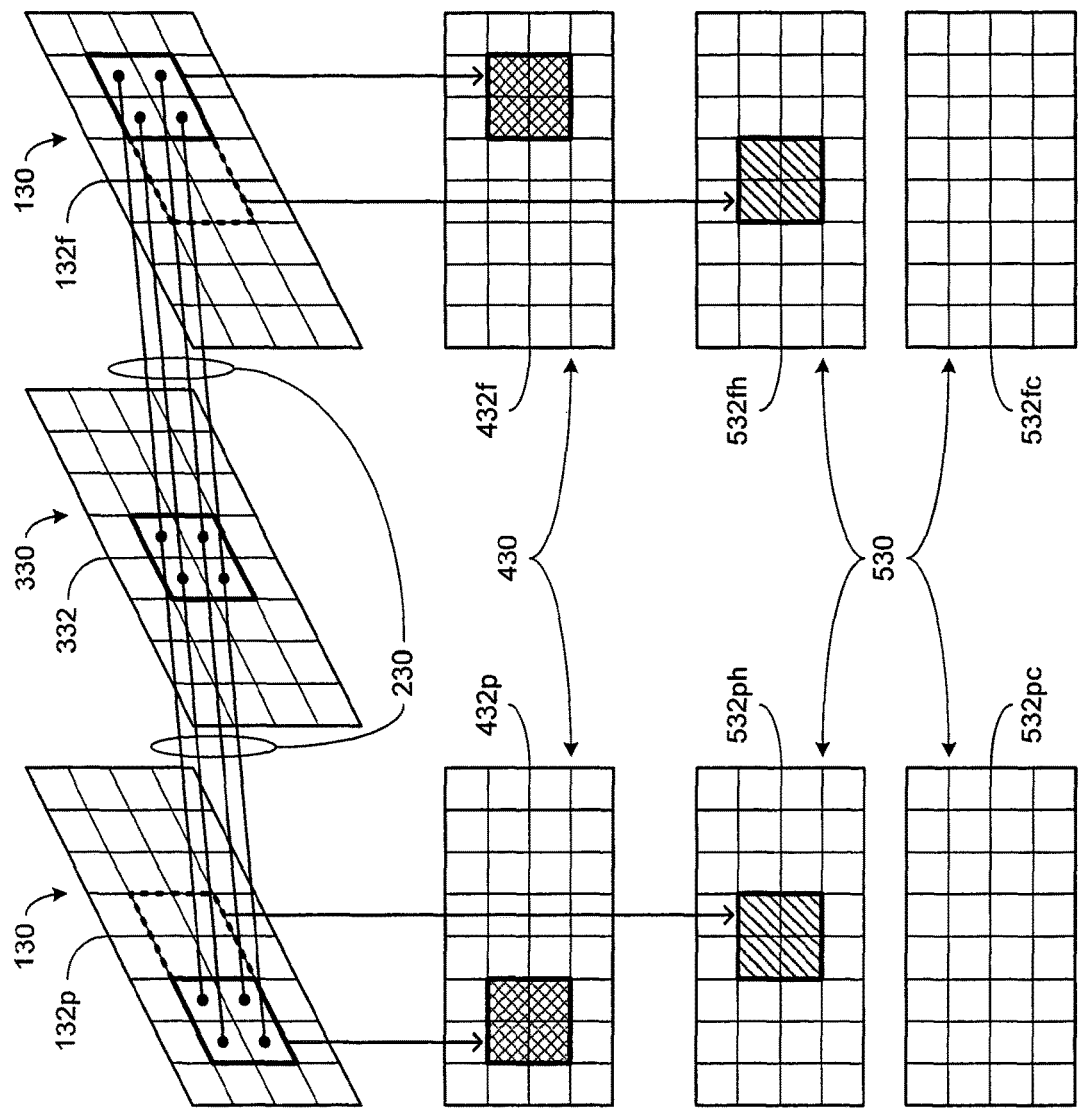
FIGS. 6-8 each illustrate an example of analyzing results of interpolation.
Figure 7:
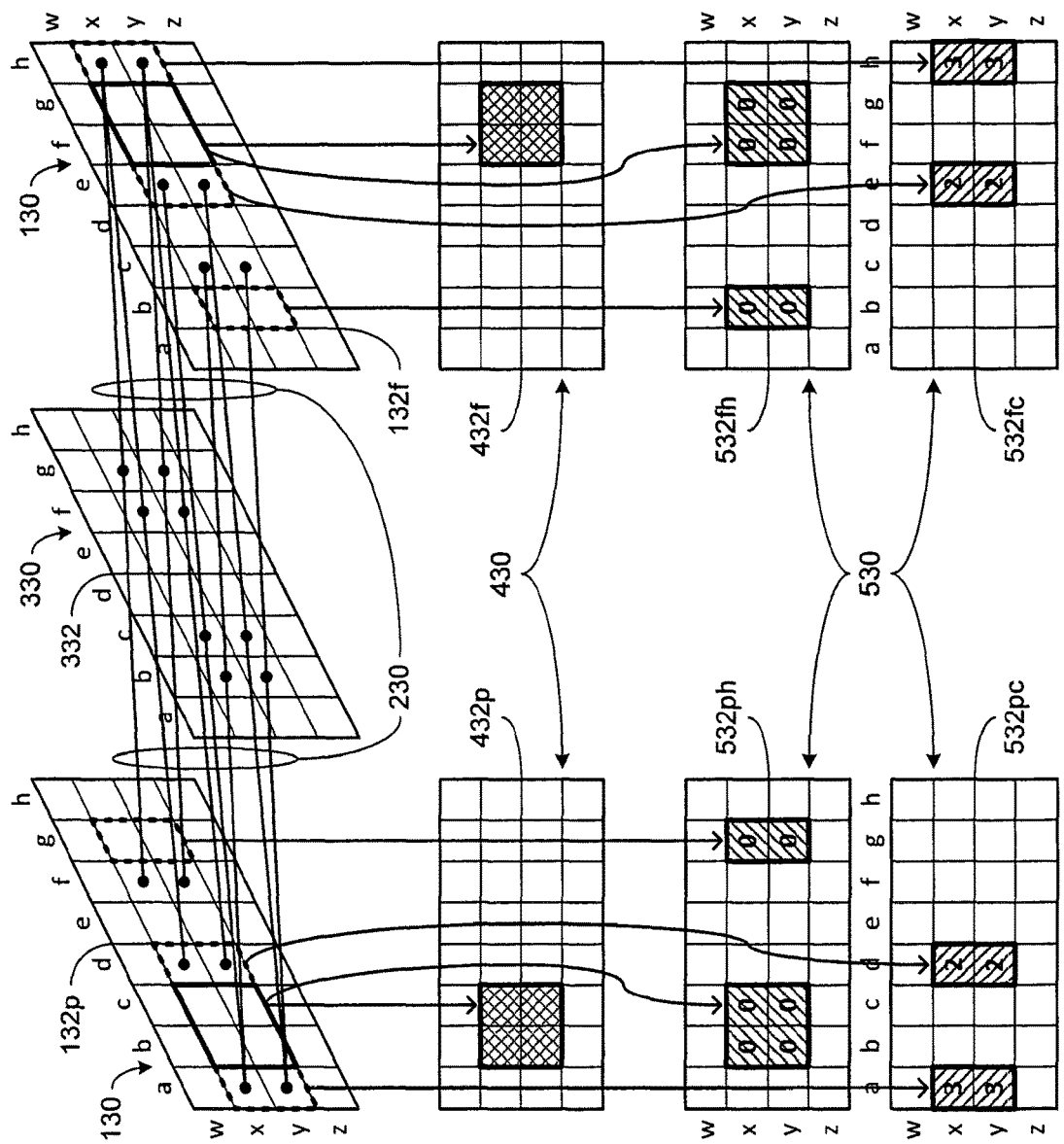
Figure 8:
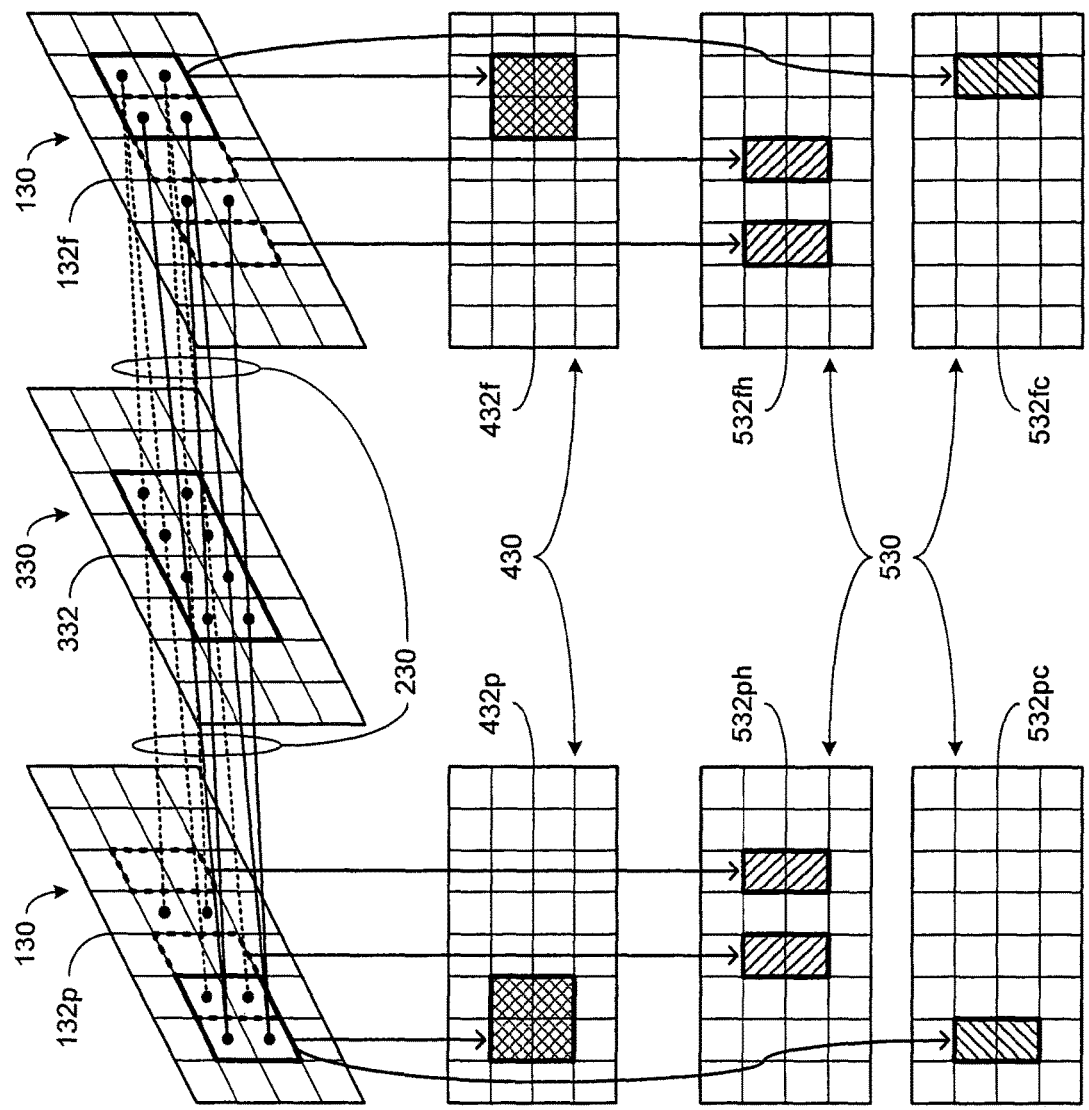

FIGS. 6, 7 and 8 depict examples of analysis of an example pair of the base frames 132*p* and 132*f*, as well as associated motion vectors, to determine whether to use different depicted examples of the interpolated frame 332 generated therefrom. More precisely, the same pair of adjacent base frames 132p and 132f is depicted in each of FIGS. 6-8 in which an object represented by a 2×2 square of pixels moves between two different positions in the temporal progression from the same base frame 132p to the same base frame 132f. However, in each of FIGS. 6-8, a different example set of motion vectors is derived from the base frames 132p and 132f (e.g., by the interpolating component 441), leading to a different example of the interpolated frame 332 that is generated (or that could be generated) based on those base frames and those motion vectors. Again, in each of FIGS. 6-8, if the interpolated frame 332 is selected for use, then it would be inserted in the up-converted video stream 631 at a position temporally between the base frames 132p and 132f. Each of FIGS. 6-8 depicts aspects of the analysis performed to determine whether or not to use the depicted example interpolated frame 332. It should be noted that the example pair of base frames 132p and 132f used in all three of FIGS. 6-8, as well as each of the different examples of the interpolated frame 332 generated therefrom, are deliberately highly simplified examples presented herein to facilitate discussion and understanding, and should not be taken as limiting what is presented herein to such simplistic situations. Specifically, each of the frames depicted in FIGS. 6-8 are only 4×8 pixels in resolution, and it is to be understood that more typical examples frames of the motion video 880 may each be of far greater resolution.

FIG. 6 depicts an example of what may be deemed a successful generation of the motion vectors from base frames 132p and 132f enabling an example of successful generation of the interpolated frame 332 depicted therein. Specifically, the object is depicted in the interpolated frame 332 at a location along the path between its locations in each of the base frames 132p and 132f with no visual artifacts that involve the edges of the object. More precisely, bilateral motion vectors that depict the change in position of each of the four pixels of the 2×2 square of pixels of the object from the base frame 132p to the base frame 132f have been correctly derived, and these correctly derived bilateral motion vectors enable a correct depiction of the object in the interpolated frame 332.

As previously discussed, analysis to determine whether to use the interpolated frame 332 includes analyzing each of the base frames 132p and 132f to locate edges among pixel color values of the pixels of each. In each of the base frames 132p and 132f, the 2×2 pixel object is the only object depicted therein, and the pixel color values of its four pixels are easily distinguished from the pixel color values of all of the other pixels. Therefore, as depicted, the edge maps 432p and 432f derived from the base frames 132p and 132f, respectively, indicate the only edges in each of these base frames as being the ones that define the shape of this single 2×2 pixel object.

Analysis to determine whether to use the interpolated frame 332 also includes analyzing at least the motion vectors in conjunction with each of the base frames 132p and 132f to locate holes and collisions of each. More precisely, the multiplicity with which the pixel color values of the pixels of each of these base frames is determined in order to identify pixels belonging to holes (e.g., pixels having a multiplicity of use of their pixel color values of zero) and/or collisions (e.g., pixels having a multiplicity of use of their pixel color values greater than one). In each of the base frames 132p and 132f, the motion vectors cause the pixel color values of the 2×2 set of pixels of the object to be used in depicting the object in the interpolated frame 332. Thus, the pixel color values of the 2×2 set of pixels at the center of each of these base frames, which are the pixels that correspond to pixels of the interpolated frame 332 at which the object is depicted, are not used in providing pixel color values of any pixel of the interpolated frame 332. Thus, in each of the base frames 132p and 132f, the 2×2 set of pixels at the center of each define a hole in each of these base frames, as indicated in the hole maps 532ph and 532fh, respectively. However, while there are holes in each of the base frames 132p and 132f, there are no collisions associated with either of these base frames as indicated in the collision maps 532pc and 532fc, respectively, since none of the pixels of either of these base frames include pixels of which the pixel color values are used more than once.

As also previously discussed, once locations of edges, holes and collisions associated with each of the base frames 132p and 132f have been identified, comparisons of such locations are made. Specifically, for each of these base frames, locations of edges are compared to locations of holes to derive the quantity of pixels at locations at which edges and holes coincide (e.g., the quantity $Q_{eh}$), and locations of edges are compared to locations of collisions to derive the quantity of pixels at locations at which edges and collisions coincide (e.g., the quantity $Q_{ec}$). For each of the base frames 132p and 132f, these quantities are summed to generate a criterion value (e.g., the criterion value C) for each of these base frames, and then the highest of these two criterion values is compared to a predetermined threshold. If the higher of these two criterion values is greater than the predetermined threshold, then the interpolated frame 332 is not used.

Given that a comparison of the edge maps 432p and 432f to the hole maps 532ph and 532fh, respectively, reveals no coincidence between the locations of edges and the locations of holes, the quantity of pixels at locations of such coincidence is zero for each of the base frames 132p and 132f. Further, given that there are no collisions whatsoever indicated as present in either of the collision maps 532pc or 532fc, the quantity of pixels at location at which edges and collisions coincide is also zero for each of the base frames 132p and 132f. As a result, the criterion value for each of the base frames 132p and 132f is also zero. Presuming that the predetermined threshold is a positive non-zero value of some sort, then neither of the criterion values of zero will exceed it, and the example interpolated frame 332 of FIG. 6 is selected for use.

FIG. 7 depicts an example of what may be deemed an unsuccessful generation of the motion vectors from base frames 132p and 132f leading to an example of unsuccessful generation of the interpolated frame 332, as depicted therein. To facilitate better understanding of this discussion of FIG. 7, the depictions of the base frames 132p and 132f, the interpolated frame 332, the hole maps 532ph and 532fh, and the collision maps 532pc and 532fc have been provided with a common coordinate system in which rows are designated with letters w through z, and columns are designated with letters a-h. In this way, each position at which a pixel is located is able to be specifically named in this discussion. Also, indications have been provided in each of the hole maps 532ph and 532fh, and in each of the collision maps 532pc and 532fc, of the multiplicity of use of color values at particular ones of the positions to still further facilitate better understanding.

Unlike the results of the successful derivation of vectors in FIG. 6, in which a correct example of the interpolated frame 332 could be derived, the 2×2 pixel object is errantly not depicted at all in the interpolated frame 332 in FIG. 7. More precisely, erroneous motion vectors have been derived that cause pixel color values of pixels other than those of the 2×2 pixel object in each of the base frames 132*p* and 132*f* to be errantly used in determining pixel color values of what should be pixels of the 2×2 pixel object in the interpolated frame 332. Further, no motion vectors have been derived that cause any use to be made of the pixel color values of the pixels that make up the 2×2 pixel object in either of the base frames 132*p* or 132*f*. Thus, the pixel color values of the pixels at positions (b,x), (b,y), (c,x) and (c,y) of the base frame 132*p*, which are the pixels with the pixel color values that depict the 2×2 pixel object in the base frame 132*p*, are not used in determining any pixel color value of any pixel in the interpolated frame 332. Correspondingly, the pixel color values of the pixels at positions (f,x), (f,y), (g,x) and (g,y) of the base frame 132*f*, which are the pixels with the pixel color values that depict the 2×2 pixel object in the base frame 132*f*, are also not used in determining any pixel color value of any pixel in the interpolated frame 332.

Turning to the analysis to determine whether or not to use the interpolated frame 332, the fact that the same two base frames 132*p* and 132*f* are used throughout the examples depicted in FIGS. 6-8 results in the edge maps 432*p* and 432*f* being identical to those of FIG. 6.

Since the pixel color values of the pixels depicting the 2×2 pixel object in each of the base frames 132*p* and 132*f* are not used at all in determining the pixel color values of any pixel of the interpolated frame 332, the locations of those very same pixels define a subset of the locations of holes of the base frames 132*p* and 132*f*, as depicted in the hole maps 532*ph* and 532*fh*. However, the same errant motion vectors also cause pixel color values of pixels at other locations in the base frames 132*p* and 132*f* to also not be used at all in determining any pixel color value of any pixel of the interpolated frames. Thus, the holes of the base frame 132*p* are defined by positions (b,x), (b,y), (c,x), (c,y), (g,x) and (g,y) of the base frame 132*p* (as depicted by the hole map 532*ph*). Correspondingly, the holes of the base frame 132*f* are defined by positions (b,x), (b,y), (f,x), (f,y), (g,x) and (g,y) of the base frame 132*f* (as depicted by the hole map 532*fh*). Again, the fact that no use is made of pixel color values at those locations is further indicated by the explicit marking of the multiplicity value of "0" at each of those positions in these hole maps.

Further, the errant multiple use of other pixels, including some that are adjacent the 2×2 pixel object in each of the base frames 132*p* and 132*f*, results in there being collisions in these base frames defined by the locations of those errantly used pixels, as depicted in the collision maps 532*pc* and 532*fc*. Specifically, the pixel color values of the pixels at positions (a,x), (a,y), (d,x) and (d,y) of the base frame 132*p* (as depicted by the collision map 532*pc*), and of the pixels at positions (e,x), (e,y), (h,x) and (h,y) of the base frame 132*f* (as depicted by the collision map 532*fc*) are errantly used multiple times as a result of the errantly derived motion vectors.

As indicated in the collision map 532*pc*, the pixel color value of the pixel of the base frame 132*p* at position (a,x) is used to determine three pixel color values of the interpolated frame 332, specifically, the pixel color values of the pixels at positions (a,x), (b,x) and (c,x) in the interpolated frame 332. The use of this one pixel color value in the base frame 132*p* in determining the pixel color values at the two positions (b,x) and (c,x) in the interpolated frame 332 arises as a result of two of the errant motion vectors, and is in addition to the correct use of that same pixel color value in determining the pixel color value at the position (a,x) in the interpolated frame 332, which is not associated with any motion vector. Thus, as indicated with the marking of "3" at the position (a,x) in the collision table 532*pc*, the pixel color value of the pixel at position (a,x) in the base frame 132*p* is errantly used three times, when it should have been used only once. The pixel color value of the pixel at position (a,y) in the base frame 132*p*, and the pixel color values of the pixels at positions (h,x) and (h,y) in the base frame 132*f* are similarly errantly used three times, when each should have been used only once.

As also indicated in the collision map 532*pc*, the pixel color value of the pixel of the base frame 132*p* at position (d,x) is used to determine two pixel color values of the interpolated frame 332, specifically, the pixel color values of the pixels at positions (d,x) and (f,x) in the interpolated frame 332. The use of this one pixel color value in the base frame 132*p* in determining the pixel color values at the position (f,x) in the interpolated frame 332 arises as a result of one of the errant motion vectors, and is in addition to the correct use of that same pixel color value in determining the pixel color value at the position (d,x) in the interpolated frame 332, which is not associated with any motion vector. Thus, as indicated with the marking of "2" at the position (d,x) in the collision table 532*pc*, the pixel color value of the pixel at position (d,x) in the base frame 132*p* is errantly used twice, when it should have been used only once. The pixel color value of the pixel at position (d,y) in the base frame 132*p*, and the pixel color values of the pixels at positions (e,x) and (e,y) in the base frame 132*f* are similarly errantly used twice, when each should have been used only once.

Upon comparison of the locations of edges and holes for each of the base frames 132*p* and 132*f*, the analysis reveals that four pixels in each of these base frames are at locations at which edges and holes coincide. However, a comparison of the locations of edges and collisions for each of the base frames 132*p* and 132*f* reveals no pixels at locations at which edges and collisions coincide for either of these base frames. Thus, the resulting criterion values for each of the base frames 132*p* and 132*f* would reflect the equal quantities of pixels at locations at which edges and holes coincide. Given the rather high degree of visual artifacts in depicting the 2×2 object in the interpolated frame 332, which includes the lack of depiction of all edges of the 2×2 object, the criterion value associated with either of the base frames 132*p* or 132*f* may exceed the predetermined threshold. As a result, the example interpolated frame 332 of FIG. 7 may not be selected for use.

FIG. 8 depicts an example of what may be deemed another unsuccessful generation of the motion vectors from base frames 132*p* and 132*f* leading to another example of unsuccessful generation of the interpolated frame 332, as depicted therein. Specifically, the 2×2 pixel object is depicted in a manner in which it is errantly stretched along the path between its locations in each of the base frames 132*p* and 132*f*. More precisely, erroneous motion vectors have been derived that cause pixel color values of two of the four pixels of the 2×2 pixel object in each of the base frames 132*p* and 132*f* to be errantly used twice in determining pixel color values of pixels in the interpolated frame 332 such that the quantity of pixels of the interpolated frame 332 employed in depicting the object is errantly doubled. Further, no motion vectors have been derived that cause any use to be made of the pixel color values of a pair of 1×2 sets of pixels in each of the base frames in each of the base frames 132*p* and 132*f*. Again, half of the motion vectors have been drawn with solid lines and half with dotted lines to make them easier to distinguish from each other.

Turning to the analysis to determine whether or not to use the interpolated frame 332, the fact that the same two base frames 132p and 132f are used throughout the examples depicted in FIGS. 6-8 results in the edge maps 432p and 432f being identical to those of FIGS. 6 and 7. As just described, the pixel color values of a pair or 1×2 sets of pixels in each of these base frames are not used at all in determining the pixel color values of any pixel of the interpolated frame 332, and this is indicated in the hole maps 532ph and 532fh. Further, the errant multiple use of two of the four pixels of the 2×2 pixel object in each of the base frames 132p and 132f results in there being collisions defined by the locations of those two of the four pixels of the object in each of these base frames, and this is indicated in the collision maps 532pc and 532fc.

Upon comparison of the locations of edges and holes for each of the base frames 132p and 132f, the analysis reveals that no pixels in either of these base frames are at locations at which edges and holes coincide. However, a comparison of the locations of edges and collisions for each of the base frames 132p and 132f reveals that two pixels in each of these base frames are at locations at which edges and collisions coincide. Thus, the resulting criterion values for each of the base frames 132p and 132f would reflect the equal quantities of pixels at locations at which edges and collisions coincide. Given the rather high degree of visual artifacts in depicting the 2×2 object in the interpolated frame 332, which includes adding significantly to the overall length of the edges that define it by doubling its size, the criterion value associated with either of the base frames 132p or 132f may exceed the predetermined threshold. As a result, the example interpolated frame 332 of FIG. 8 may not be selected for use.

Returning to FIG. 1, in various embodiments, the display device 600 (if present) incorporates one or more of a processor component 650, a storage 660, a display 680 and an interface 690 to couple the display device 600 to the network 999. The storage 660 stores a control routine 640 and the up-converted video data 630. The control routine 640 incorporates a sequence of instructions operative on the processor component 650 in its role as a main processor component of the display device 600 to implement logic to perform various functions. In executing the control routine 640 in some embodiments, the processor component 650 may receive the up-converted video data 630 representing the motion video 880 from the computing device 300, and may visually present it on the display 680.

Figure 2:
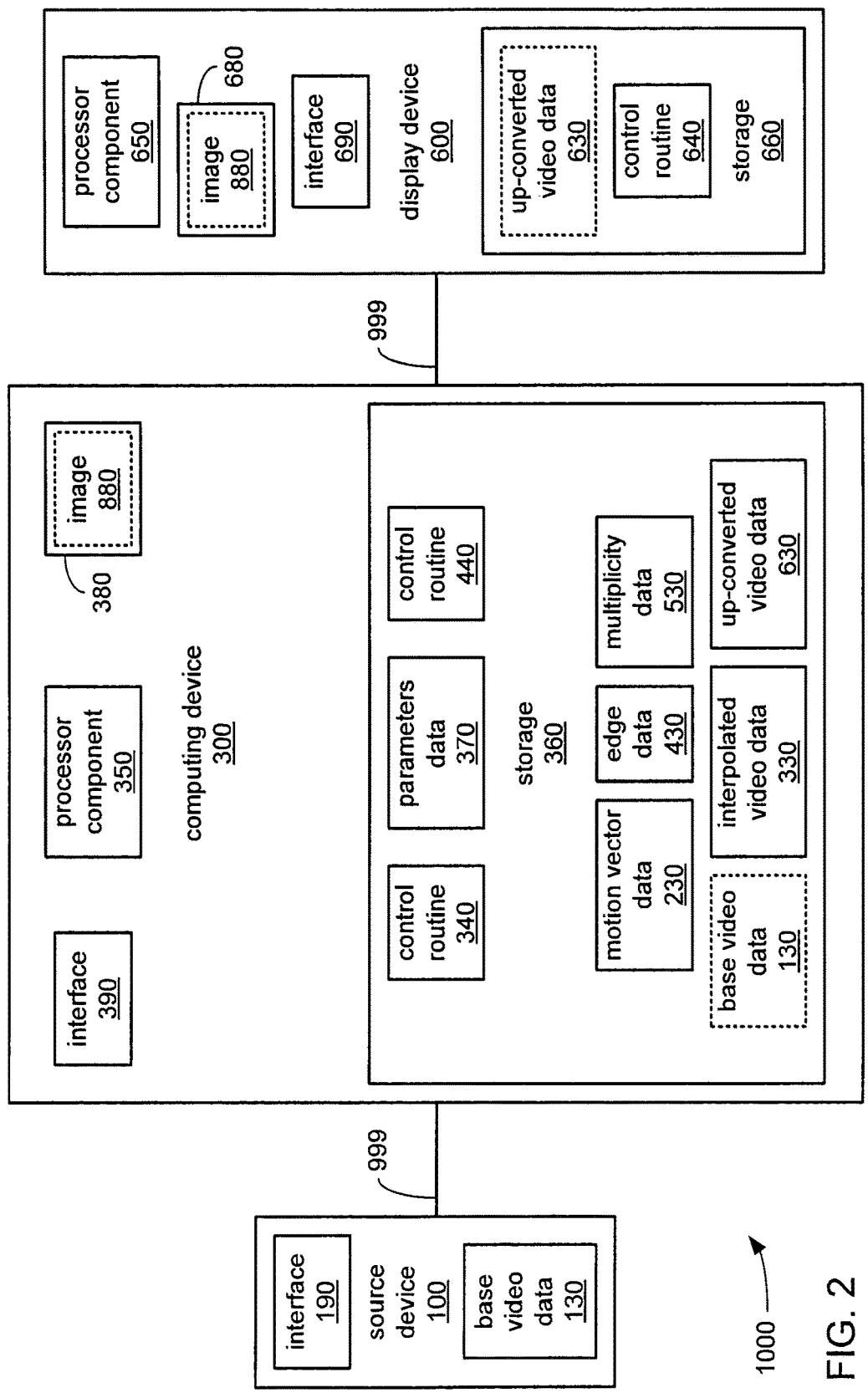
FIG. 2 illustrates an alternate embodiment of a video processing system.

FIG. 2 illustrates a block diagram of an alternate embodiment of the video processing system 1000 that includes an alternate embodiment of the computing device 300. The alternate embodiment of the video presentation system 1000 of FIG. 2 is similar to the embodiment of FIG. 1 in many ways, and thus, like reference numerals are used to refer to like elements throughout. However, unlike the computing device 300 of FIG. 1, the computing device 300 of FIG. 2 does not incorporate the controller 400. Thus, unlike the computing device 300 of FIG. 1, in the computing device 300 of FIG. 2, it is the processor component 350 that executes the control routine 440 in lieu of there being a processor component 450 to do so. Therefore, in the alternate embodiment of the video presentation system 1000 of FIG. 2, the processor component 350 may up-convert the frame rate of the representation of the motion video 880 of the base video data 130 to generate the up-converted video data 630.

In various embodiments, each of the processor components 350, 450 and 650 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are in some way linked.

Although each of the processor components 350, 450 and 650 may include any of a variety of types of processor, it is envisioned that the processor component 450 of the controller 400 (if present) may be somewhat specialized and/or optimized to perform tasks related to graphics and/or video. More broadly, it is envisioned that the controller 400 embodies a graphics subsystem of the computing device 300 to enable the performance of tasks related to graphics rendering, video compression, image rescaling, etc., using components separate and distinct from the processor component 350 and its more closely related components.

In various embodiments, each of the storages 360, 460 and 660 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the interfaces 190, 390 and 690 may employ any of a wide variety of signaling technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 9:
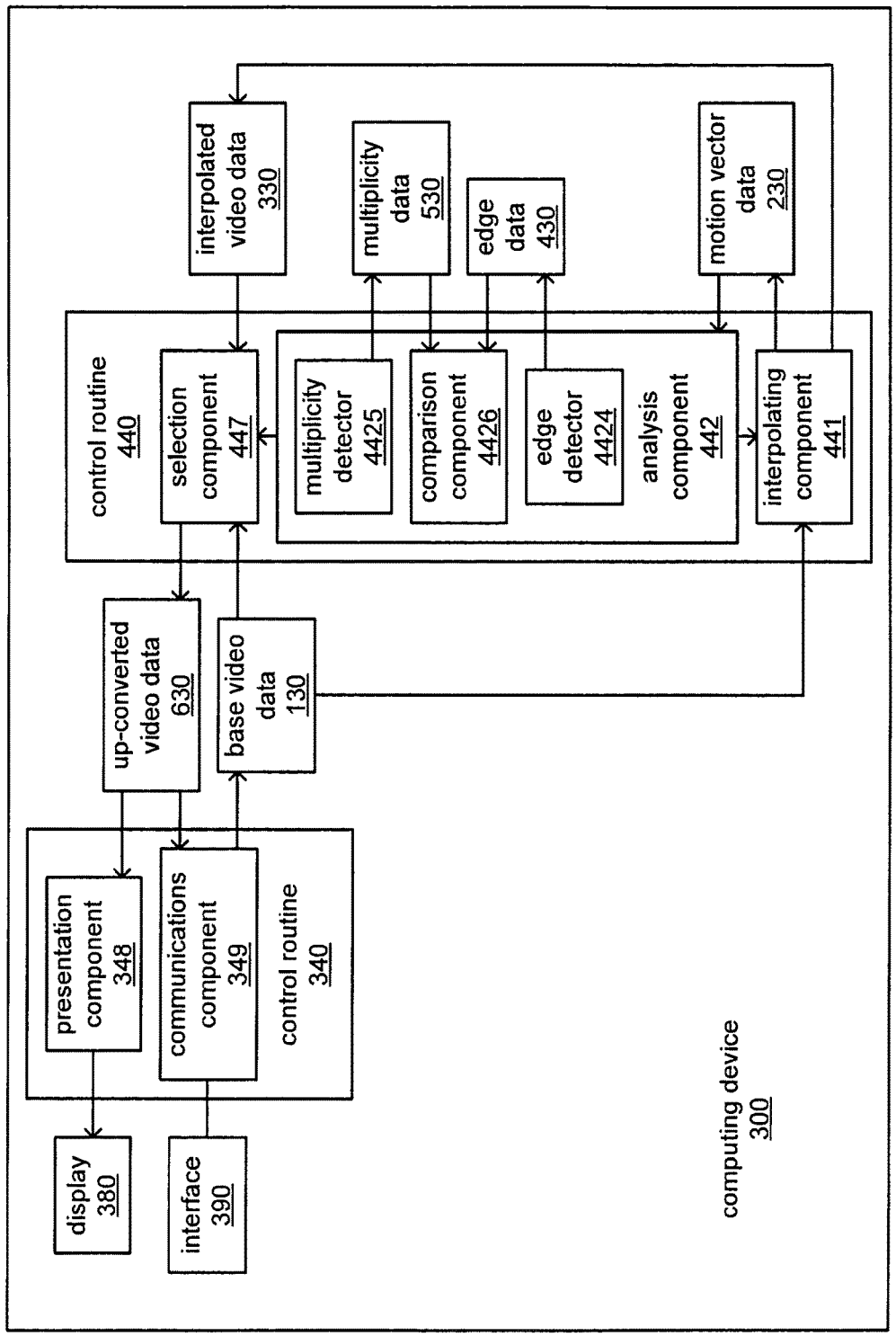
FIG. 9 illustrates a portion of an embodiment.

FIG. 9 illustrates a block diagram of a portion of an embodiment of the video processing system 1000 of either FIG. 1 or FIG. 2 in greater detail. More specifically, FIG. 9 depicts aspects of the operating environment of the computing device 300 in which the processor components 350 and/or 450, in executing the control routines 340 and/or 440, up-convert the frame rate of the base video data 130 representing the motion video 880 to generate the up-converted video data 630. As recognizable to those skilled in the art, the control routines 340 and 440, including the components of which each is composed, are selected to be operative on whatever type of processor or processors that are selected to implement applicable ones of the processor components 350 or 450.

In various embodiments, each of the control routines 340 and 440 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor components 350 or 450. Where one or more device drivers are included, those device drivers may provide support for any of a variety of other components, whether hardware or software components, of the computing device 300 or the controller 400.

The control routine 340 may include a communications component 349 executable by whatever ones of the processor components 350 or 450 to operate the interface 390 to transmit and receive signals via the network 999 as has been described. Among the signals received may be signals conveying the base video data 130 and/or the up-converted video data 630 among one or more of the computing devices 100, 300 or 600 via the network 999. As will be recognized by those skilled in the art, the communications component 349 is selected to be operable with whatever type of interface technology is selected to implement the interface 390.

The control routine 440 may include the interpolating component 441 executable by the processor component 350 and/or 450 to analyze adjacent pairs of the base frames 132 of the base stream 131 of the base video data 130 to generate motion vectors of the motion vector data 230 and/or corresponding ones of the interpolated frames 332 as has been described. As has been discussed, the interpolating component 441 may condition its generation of each interpolated frame 332 on receipt of an indication that the interpolated frame 332 is selected for use.

The control routine 440 may include the analysis component 442 executable by the processor component 350 and/or 450 to analyze the adjacent pairs of the base frames 132 along with corresponding motion vectors generated by the interpolating component 441 to determine whether or not corresponding ones of the interpolated frame 332 will be used. As depicted, the analysis component 442 may incorporate an edge detector 4424, a multiplicity detector 4425 and a comparison component 4426. The edge detector 4424 may analyze each base frame 132 of a pair of adjacent base frames 132 in the base stream 131 to determine locations of edges defined by pixel color values of pixels of each of those base frames, and may store indications of the locations of those edges (e.g., the edge maps 432$p$ and/or 432$f$) as the edge data 430. The multiplicity detector 4425 may analyze at least the indications of the motion vectors stored as the motion vector data 230 to determine the multiplicity of use of the pixel color values of each pixel of each base frame 132 of the pair of adjacent base frames 132 to determine which of those pixels belong to holes (e.g., which pixels have a multiplicity of use of zero) and/or collisions (e.g., which pixels have a multiplicity of use greater than one) of each of those base frames. The multiplicity detector 4425 may store indications of the locations of those holes (e.g., the hole maps 532$ph$ and/or 532$fh$) and/or collisions (e.g., the collision maps 532$pc$ and/or 532$fc$) as the multiplicity data 530. Alternatively, the multiplicity detector 4425 may store a single map for each of the base frames 132 of the pair of base frames (e.g., the base frames 132$p$ and 132$f$) indicating the multiplicity values for each pixel.

As has been discussed, the interpolating component 441 may condition its generation of each interpolated frame 332 on receipt of an indication that the interpolated frame 332 is selected for use. In such embodiments, the analysis component 442 may signal the interpolating component 441 with such an indication. Alternatively or additionally, the control routine 440 may include a selection component 447 executable by the processor component 350 and/or 450 to select, for each pair of adjacent base frames 132, either the corresponding interpolated frame 332 or a repeat of one of the base frames 132 of the pair of adjacent base frames 132 to insert between the pair of adjacent base frames 132 in the up-converted stream 631 of the up-converted video data 630.

The control routine 340 may include a presentation component 348 executable by the processor component 350 to operate the display 380 to visually present the motion video 880 with the up-converted frame rate enabled by the up-converted stream representing the motion video 880 in the up-converted video data 630. Alternatively, as has been discussed, the up-converted video data 630 may be transmitted to another device (e.g., the display device 600) for remote storage and/or visual presentation.

Figure 10:
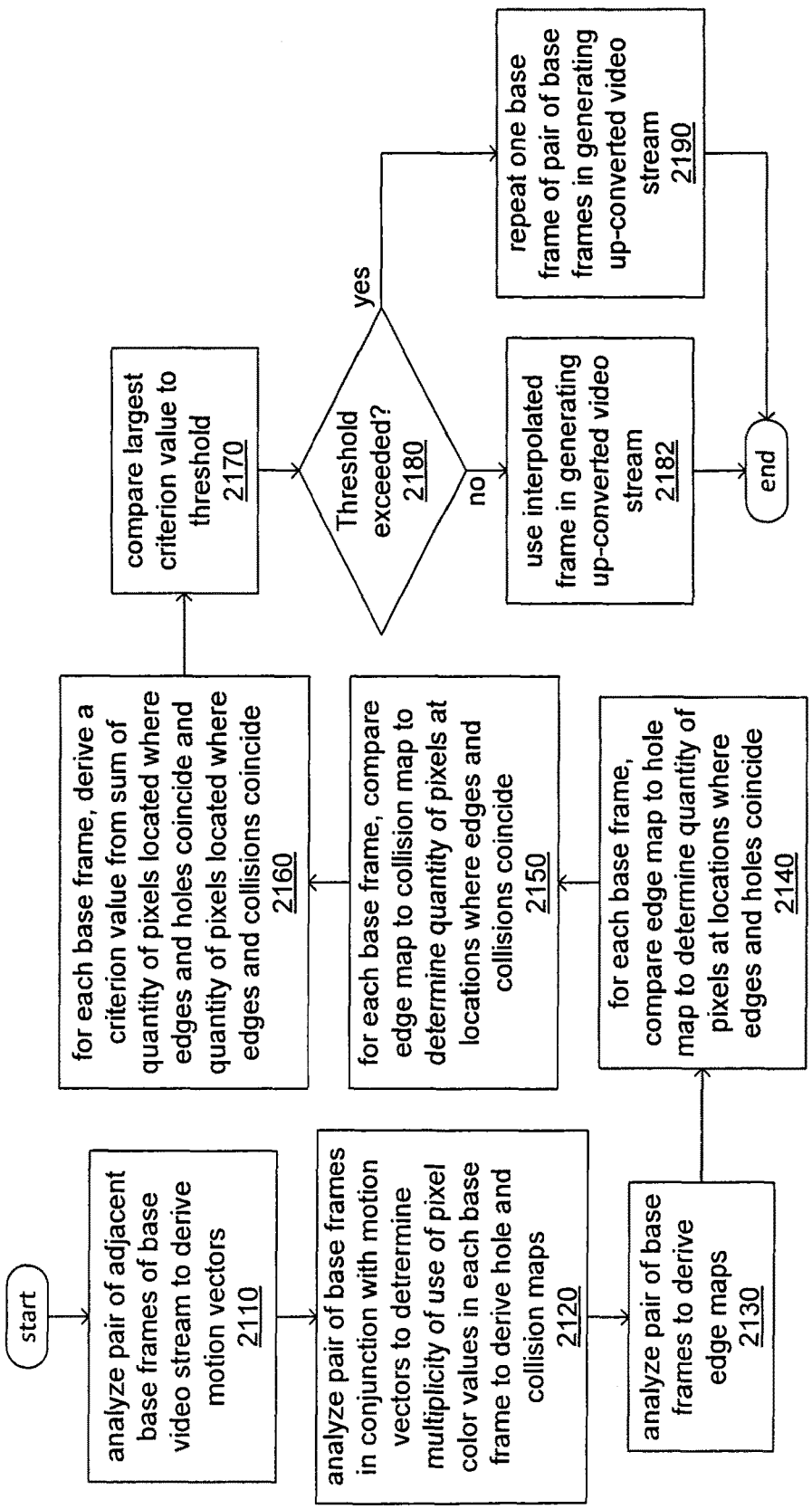
FIG. 10 illustrates a logic flow according to an embodiment.

FIG. 10 illustrates one embodiment of a logic flow 2100. The logic flow 2100 may be representative of some or all of the operations executed by one or more embodiments described herein. More specifically, the logic flow 2100 may illustrate operations performed by the processor component 350 or 450 in executing at least the control routine 440, and/or performed by other component(s) of the computing device 300 or the controller 400, respectively.

At 2110, a processor component of a computing device (e.g., either the processor component 350 of the computing device 300, or the processor component 450 of the controller 400) analyzes a pair of base frames that are temporally adjacent to each other in a base video stream (e.g., a pair of the base frames 132 of the base stream 131, such as the base frames 132$p$ and 132$f$) to derive motion vectors. As previously discussed, any of a variety of algorithms may be employed to analyze pairs of adjacent base frames to detect one or more of what appear to be objects in motion between the two base frames and to derive one or more motion vectors indicative of an extent of motion, a direction of motion and which pixels of the two base frames are associated with the motion. As also previously discussed, the motion vectors are bilateral motion vectors indicating the direction and extent of movement of what has been identified as moving objects. However, as has also been discussed, each of such algorithms is known to at least occasionally errantly identify moving objects and to thereby generate errant motion vectors.

At 2120, the pair of base frames and the motion vectors are analyzed together to determine the multiplicity of use of pixel color values of each of the pixels of each of the base frames in generating pixel color values of an interpolated frame that is generated (or which may be generated) from the pair of base frames and the motion vectors. Hole maps indicating pixels having pixel color values that are not used at all (e.g., their multiplicity of use is zero) and/or collision maps indicating pixels having pixel color values that are used more than once (e.g., their multiplicity is greater than one) may be generated to provide indications of the locations of such holes and collisions.

At 2130, the pair of base frames are analyzed to determine locations of edges indicated by relatively high degrees of difference in pixel color values of adjacent pixels in each of base frames. As previously discussed, any of a variety of algorithms may be employed to determine locations of edges in each of the base frames of the pair of base frames. Edge maps indicating which pixels coincide with locations of edges may be generated for each of the base frames.

At 2140, the edge map and hole map of each of the base frames are compared to determine the quantity of pixels of each of the base frames that are at locations where edges and holes coincide. Correspondingly, at 2150, the edge map and collision map of each of the base frames are compared to determine the quantity of pixels of each of the base frames that are at locations where edges and collisions coincide.

At 2160, a criterion value is derived for each of the base frames from the sum of the quantity of pixels located where edges and holes coincide and the quantity of pixels located where edges and collisions coincide. As previously discussed, the criterion values are indicative of the degree of visual artifacts involving edges of moving objects that are present in an interpolated frame generated from (or that may be generated from) the pair of base frames and the motion vectors.

At 2170, the larger of the two criterion values is compared to a predetermined threshold. If the threshold is not exceeded at 2180, then the interpolated frame generated from (or to be generated from) the pair of base frames and the motion vectors is used in generating an up-converted video stream from the base video stream at 2182. However, if the threshold his exceeded at 2180, then one of the base frames of the pair of base frames is repeated, and that repeat of that base frame is used in generating the up-converted video stream from the base video stream at 2190.

Figure 11:
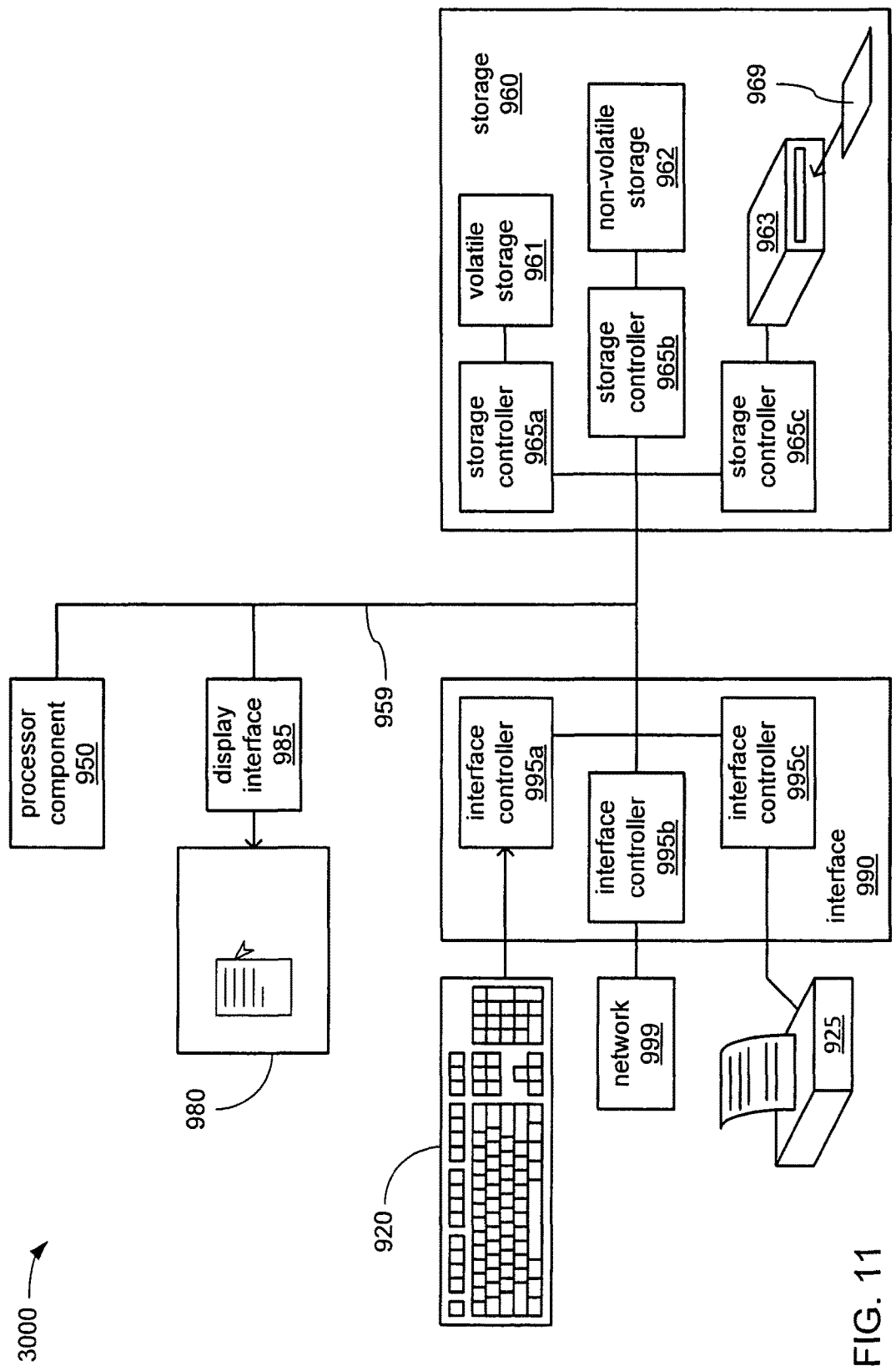
FIG. 11 illustrates a processing architecture according to an embodiment.

FIG. 11 illustrates an embodiment of an exemplary processing architecture 3000 suitable for implementing various embodiments as previously described. More specifically, the processing architecture 3000 (or variants thereof) may be implemented as part of one or more of the computing devices 100, 300, or 600, and/or as part of the controller 400. It should be noted that components of the processing architecture 3000 are given reference numbers in which the last two digits correspond to the last two digits of reference numbers of at least some of the components earlier depicted and described as part of the computing devices 100, 300 and 600, as well as the controller 400. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device includes at least a processor component 950, a storage 960, an interface 990 to other devices, and a coupling 959. As will be explained, depending on various aspects of a computing device implementing the processing architecture 3000, including its intended use and/or conditions of use, such a computing device may further include additional components, such as without limitation, a display interface 985.

The coupling 959 includes one or more buses, point-to-point interconnects, transceivers, buffers, crosspoint switches, and/or other conductors and/or logic that communicatively couples at least the processor component 950 to the storage 960. Coupling 959 may further couple the processor component 950 to one or more of the interface 990, the audio subsystem 970 and the display interface 985 (depending on which of these and/or other components are also present). With the processor component 950 being so coupled by couplings 959, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which signals are optically and/or electrically conveyed. Further, at least portions of couplings 959 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor components 350, 450 and 650) may include any of a wide variety of commercially available processors, employing any of a wide variety of technologies and implemented with one or more cores physically combined in any of a number of ways.

As previously discussed, the storage 960 (corresponding to the storages 360, 460 and 660) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (possibly corresponding to the interfaces 190, 390 or 690) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, a microphone to monitor sounds of persons to accept commands and/or data signaled by those persons via voice or other sounds they may make, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

Figure 12:
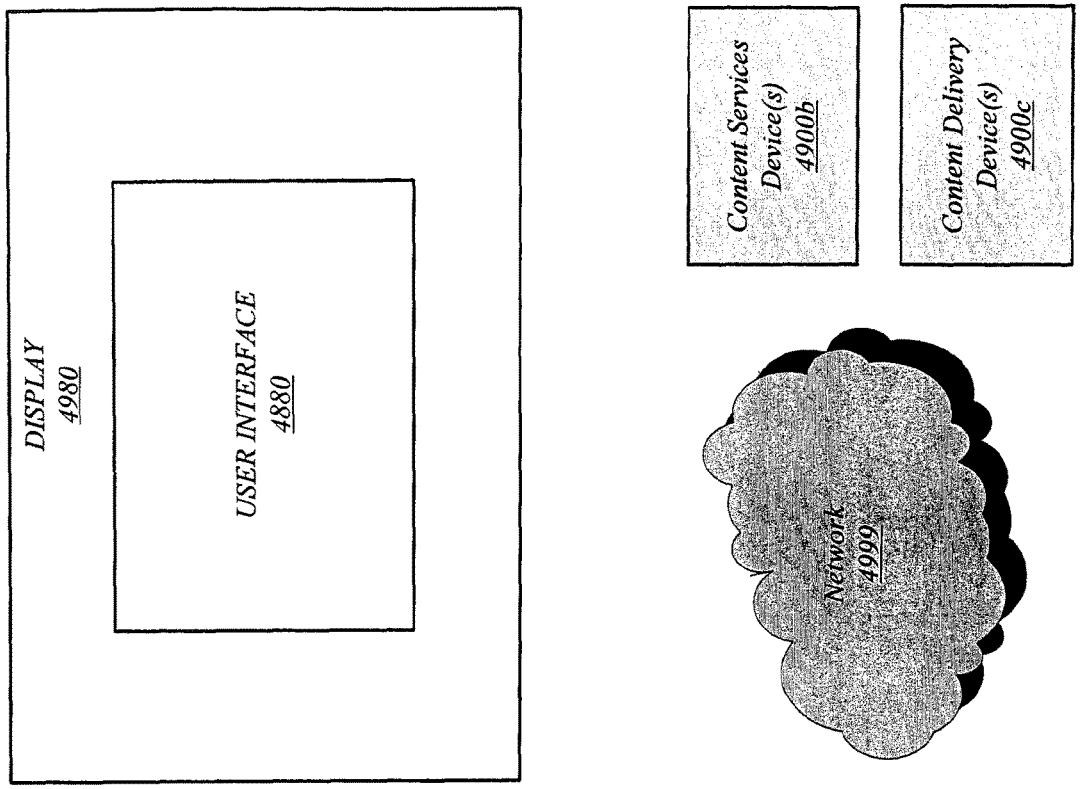
FIG. 12 illustrates another alternate embodiment of a graphics processing system.
Figure 12:
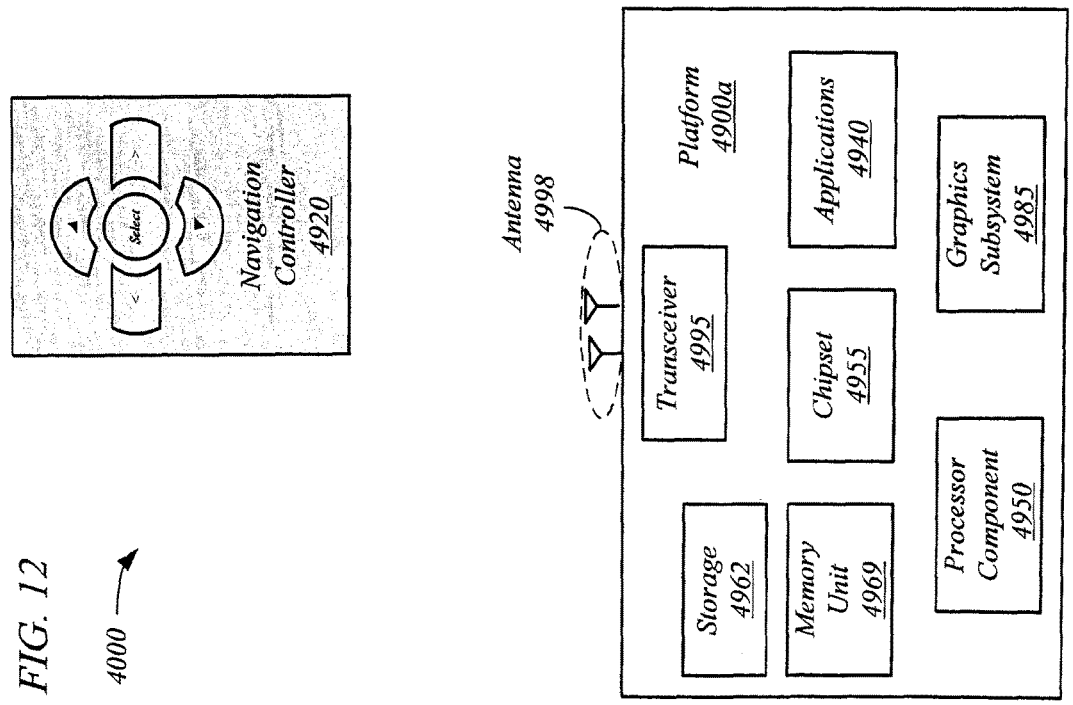

FIG. 12 illustrates an embodiment of a system 4000. In various embodiments, system 4000 may be representative of a system or architecture suitable for use with one or more embodiments described herein, such as the graphics processing system 1000; one or more of the computing devices 100, 300 or 600; and/or one or more of the logic flows 2100 or 2200. The embodiments are not limited in this respect.

As shown, system 4000 may include multiple elements. One or more elements may be implemented using one or more circuits, components, registers, processors, software subroutines, modules, or any combination thereof, as desired for a given set of design or performance constraints. Although FIG. 12 shows a limited number of elements in a certain topology by way of example, it can be appreciated that more or less elements in any suitable topology may be used in system 4000 as desired for a given implementation. The embodiments are not limited in this context.

In embodiments, system 4000 may be a media system although system 4000 is not limited to this context. For example, system 4000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile interne device (MID), messaging device, data communication device, and so forth.

In embodiments, system 4000 includes a platform 4900*a* coupled to a display 4980. Platform 4900*a* may receive content from a content device such as content services device(s) 4900*c* or content delivery device(s) 4900*d* or other similar content sources. A navigation controller 4920 including one or more navigation features may be used to interact with, for example, platform 4900*a* and/or display 4980. Each of these components is described in more detail below.

In embodiments, platform 4900*a* may include any combination of a processor component 4950, chipset 4955, memory unit 4969, transceiver 4995, storage 4962, applications 4940, and/or graphics subsystem 4985. Chipset 4955 may provide intercommunication among processor circuit 4950, memory unit 4969, transceiver 4995, storage 4962, applications 4940, and/or graphics subsystem 4985. For example, chipset 4955 may include a storage adapter (not depicted) capable of providing intercommunication with storage 4962.

Processor component 4950 may be implemented using any processor or logic device, and may be the same as or similar to one or more of processor components 150, 350, 450 or 650, and/or to processor component 950 of FIG. 11.

Memory unit 4969 may be implemented using any machine-readable or computer-readable media capable of storing data, and may be the same as or similar to storage media 969 of FIG. 11.

Transceiver 4995 may include one or more radios capable of transmitting and receiving signals using various suitable wireless communications techniques, and may be the same as or similar to transceiver 995*b* in FIG. 11.

Display 4980 may include any television type monitor or display, and may be the same as or similar to one or more of displays 380 and 680, and/or to display 980 in FIG. 11.

Storage 4962 may be implemented as a non-volatile storage device, and may be the same as or similar to non-volatile storage 962 in FIG. 11.

Graphics subsystem 4985 may perform processing of images such as still or video for display. Graphics subsystem 4985 may be a graphics processing unit (GPU) or a visual processing unit (VPU), for example. An analog or digital interface may be used to communicatively couple graphics subsystem 4985 and display 4980. For example, the interface may be any of a High-Definition Multimedia Interface, DisplayPort, wireless HDMI, and/or wireless HD compliant techniques. Graphics subsystem 4985 could be integrated into processor circuit 4950 or chipset 4955. Graphics subsystem 4985 could be a stand-alone card communicatively coupled to chipset 4955.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 4900*b* may be hosted by any national, international and/or independent service and thus accessible to platform 4900*a* via the Internet, for example. Content services device(s) 4900*b* may be coupled to platform 4900*a* and/or to display 4980. Platform 4900*a* and/or content services device(s) 4900*b* may be coupled to a network 4999 to communicate (e.g., send and/or receive) media information to and from network 4999. Content delivery device(s) 4900*c* also may be coupled to platform 4900*a* and/or to display 4980.

In embodiments, content services device(s) 4900*b* may include a cable television box, personal computer, network, telephone, Internet enabled devices or appliance capable of delivering digital information and/or content, and any other similar device capable of unidirectionally or bidirectionally communicating content between content providers and platform 4900*a* and/display 4980, via network 4999 or directly. It will be appreciated that the content may be communicated unidirectionally and/or bidirectionally to and from any one of the components in system 4000 and a content provider via network 4999. Examples of content may include any media information including, for example, video, music, medical and gaming information, and so forth.

Content services device(s) 4900*b* receives content such as cable television programming including media information, digital information, and/or other content. Examples of content providers may include any cable or satellite television or radio or Internet content providers. The provided examples are not meant to limit embodiments.

In embodiments, platform 4900a may receive control signals from navigation controller 4920 having one or more navigation features. The navigation features of navigation controller 4920 may be used to interact with a user interface 4880, for example. In embodiments, navigation controller 4920 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 4920 may be echoed on a display (e.g., display 4980) by movements of a pointer, cursor, focus ring, or other visual indicators displayed on the display. For example, under the control of software applications 4940, the navigation features located on navigation controller 4920 may be mapped to virtual navigation features displayed on user interface 4880. In embodiments, navigation controller 4920 may not be a separate component but integrated into platform 4900a and/or display 4980. Embodiments, however, are not limited to the elements or in the context shown or described herein.

In embodiments, drivers (not shown) may include technology to enable users to instantly turn on and off platform 4900a like a television with the touch of a button after initial boot-up, when enabled, for example. Program logic may allow platform 4900a to stream content to media adaptors or other content services device(s) 4900b or content delivery device(s) 4900c when the platform is turned "off." In addition, chip set 4955 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 4000 may be integrated. For example, platform 4900a and content services device(s) 4900b may be integrated, or platform 4900a and content delivery device(s) 4900c may be integrated, or platform 4900a, content services device(s) 4900b, and content delivery device(s) 4900c may be integrated, for example. In various embodiments, platform 4900a and display 4890 may be an integrated unit. Display 4980 and content service device(s) 4900b may be integrated, or display 4980 and content delivery device(s) 4900c may be integrated, for example. These examples are not meant to limit embodiments.

In various embodiments, system 4000 may be implemented as a wireless system, a wired system, or a combination of both. When implemented as a wireless system, system 4000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 4000 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 4900a may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 12.

Figure 13:
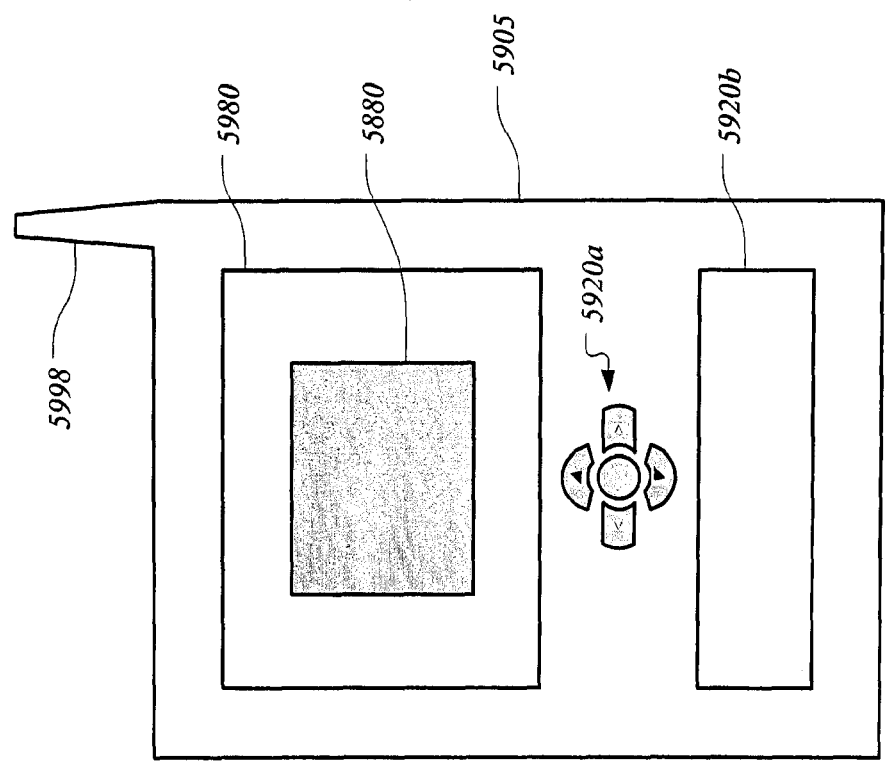
FIG. 13 illustrates an embodiment of a device.

As described above, system 4000 may be embodied in varying physical styles or form factors. FIG. 13 illustrates embodiments of a small form factor device 5000 in which system 4000 may be embodied. In embodiments, for example, device 5000 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 13, device 5000 may include a display 5980, a navigation controller 5920a, a user interface 5880, a housing 5905, an I/O device 5920b, and an antenna 5998. Display 5980 may include any suitable display unit for displaying information appropriate for a mobile computing device, and may be the same as or similar to display 4980 in FIG. 12. Navigation controller 5920a may include one or more navigation features which may be used to interact with user interface 5880, and may be the same as or similar to navigation controller 4920 in FIG. 12. I/O device 5920b may include any suitable I/O device for entering information into a mobile computing device. Examples for I/O device 5920*b* may include an alphanumeric keyboard, a numeric keypad, a touch pad, input keys, buttons, switches, rocker switches, microphones, speakers, voice recognition device and software, and so forth. Information also may be entered into device 5000 by way of a microphone. Such information may be digitized by a voice recognition device. The embodiments are not limited in this context.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

In Example 1, a device to up-convert a motion video frame rate includes an analysis component to analyze a pair of temporally adjacent base frames of a base video stream, the base frames including a preceding base frame and a following base frame, and a motion vector associated with movement of an object between the preceding base frame and the following base frame to determine a degree of visual artifacts involving an edge of the object in an interpolated frame; and a selection component to compare the degree of visual artifacts to a threshold and select the interpolated frame for insertion between the preceding base frame and the following base frame in up-converting a frame rate of the base video stream to generate an up-converted video stream based on the comparison.

In Example 2, which includes the subject matter of Example 1, the selection component may selectively insert a copy of one of the preceding base frame and the following base frame between the preceding base frame and the following base frame instead of the interpolated frame based on the comparison.

In Example 3, which includes the subject matter of any of Examples 1-2, the device may include an interpolating component to analyze the preceding base frame and the following base frame to generate the motion vector.

In Example 4, which includes the subject matter of any of Examples 1-3, the interpolating component may receive an indication from the selection component of whether the interpolated frame is selected for insertion between the preceding base frame and the following base frame, and may selectively generate the interpolated frame from the preceding base frame, the following base frame and the motion vector based on the indication.

In Example 5, which includes the subject matter of any of Examples 1-4, the analysis component may include an edge detector to determine locations of edges in each of the preceding and following base frames.

In Example 6, which includes the subject matter of any of Examples 1-5, the analysis component may include a multiplicity detector to determine locations of pixels in each of the preceding and following base frames at which a multiplicity of use of a pixel color value in determining a pixel color value of the interpolated frame is other than one.

In Example 7, which includes the subject matter of any of Examples 1-6, the analysis component may include a comparison component to determine a first quantity of pixels in each of the preceding and following base frames at which the multiplicity of use of pixel color values is zero and that coincides with an edge, and to determine a second quantity of pixels in each of the preceding and following base frames at which the multiplicity of use of pixel color values is greater than one and that coincides with an edge.

In Example 8, which includes the subject matter of any of Examples 1-7, the comparison component may determine a criterion value for the preceding base frame from a sum of the first quantity and the second quantity of the preceding base frame, may determine a criterion value for the following base frame from a sum of the first quantity and the second quantity of the following base frame, and may compare the greater of the criterion value of the preceding base frame and the criterion value of the following base frame to the threshold to determine whether to select the interpolated frame for insertion between the preceding base frame and the following base frame.

In Example 9, which includes the subject matter of any of Examples 1-8, the comparison component may multiply the first quantity of each of the preceding and following base frames by a first factor and may multiply the second quantity of each of the preceding and following base frames by a second factor to control the relative weighting of the first and second quantities in determining the criterion values for each of the preceding and following base frames.

In Example 10, which includes the subject matter of any of Examples 1-9, the comparison component may divide the criterion value of the preceding base frame by a quantity of pixels of the preceding base frame at a location coinciding with an edge, and may divide the criterion value of the following base frame by a quantity of pixels of the following base frame at a location coinciding with an edge.

In Example 11, which includes the subject matter of any of Examples 1-10, the device may include at least one of a display to visually present frames of the up-converted video stream or an interface to transmit up-converted video data including the up-converted video stream to a display device via a network following up-conversion of the base video stream to generate the up-converted video stream, the base video stream and the up-converted video stream representing a motion video.

In Example 12, a device to up-convert a motion video frame rate includes an analysis component to analyze a pair of temporally adjacent base frames of a base video stream and at least one motion vector associated with movement of an object between a preceding base frame and a following base frame of the pair of base frames to determine a degree of visual artifacts involving an edge of the object in an interpolated frame derived from the pair of base frames and the at least one motion vector; and an interpolation component to analyze the preceding base frame and the following base frame to generate the at least one motion vector and to selectively generate the interpolated frame from the pair of base frames and the at least one motion vector based on a comparison of the degree of visual artifacts to a threshold.

In Example 13, which includes the subject matter of Example 12, the analysis component may include an edge detector to determine locations of edges in each of the preceding and following base frames.

In Example 14, which includes the subject matter of any of Examples 12-13, the analysis component may include a multiplicity detector to determine locations of pixels in each of the preceding and following base frames at which a multiplicity of use of a pixel color value in determining a pixel color value of the interpolated frame is other than one.

In Example 15, which includes the subject matter of any of Examples 12-14, the analysis component may include a comparison component to determine a first quantity of pixels in each of the preceding and following base frames at which the multiplicity of use of pixel color values is zero and that coincides with an edge, and to determine a second quantity of pixels in each of the preceding and following base frames at which the multiplicity of use of pixel color values is greater than one and that coincides with an edge.

In Example 16, which includes the subject matter of any of Examples 12-15, the comparison component may determine a criterion value for the preceding base frame from a sum of the first quantity and the second quantity of the preceding base frame, may determine a criterion value for the following base frame from a sum of the first quantity and the second quantity of the following base frame, and may compare the greater of the criterion value of the preceding base frame and the criterion value of the following base frame to the threshold to determine whether to select the interpolated frame for insertion between the preceding base frame and the following base frame.

In Example 17, which includes the subject matter of any of Examples 12-16, the device may include at least one of a display to visually present frames of the up-converted video stream or an interface to transmit up-converted video data including the up-converted video stream to a display device via a network following up-conversion of the base video stream to generate the up-converted video stream, the base video stream and the up-converted video stream representing a motion video.

In Example 18, a computing-implemented method for up-converting a motion video frame rate includes analyzing a pair of temporally adjacent base frames of a base video stream, the base frames including a preceding base frame and a following base frame, and a motion vector associated with movement of an object between the preceding base frame and the following base frame to determine a degree of visual artifacts involving an edge of the object in an interpolated frame; and selectively inserting the interpolated frame between the preceding base frame and the following base frame to up-convert a frame rate of the base video stream to generate an up-converted video stream based on a comparison of the degree of visual artifacts to a threshold.

In Example 19, which includes the subject matter of Example 18, the method may include selectively inserting a copy of one of the preceding base frame and the following base frame between the preceding base frame and the following base frame instead of the interpolated frame based on the comparison.

In Example 20, which includes the subject matter of any of Examples 18-19, the method may include analyzing the preceding base frame and the following base frame to generate the motion vector.

In Example 21, which includes the subject matter of any of Examples 18-20, the method may include selectively generating the interpolated frame from the preceding base frame, the following base frame and the motion vector based on the comparison.

In Example 22, which includes the subject matter of any of Examples 18-21, the method may include analyzing the preceding base frame and the following base frame to determine locations of edges in each.

In Example 23, which includes the subject matter of any of Examples 18-22, the method may include generating an edge map indicative of locations of edges for each of the preceding and following base frames.

In Example 24, which includes the subject matter of any of Examples 18-23, the method may include analyzing at least the motion vector to determine locations of pixels in each of the preceding and following base frames at which a multiplicity of use of a pixel color value in determining a pixel color value of the interpolated frame is other than one.

In Example 25, which includes the subject matter of any of Examples 18-24, the method may include generating a hole map for each of the preceding and following base frames indicative of locations of pixels of which pixel color values are not used in determining any pixel color value of the interpolated frame, and generating a collision map for each of the preceding and following base frames indicative of locations of pixels of which pixel color values are not used in determining any pixel color value of the interpolated frame; and In Example 26, which includes the subject matter of any of Examples 18-25, the method may include determining a first quantity of pixels in each of the preceding and following base frames at which the multiplicity of use of pixel color values is zero and that coincides with an edge, and determining a second quantity of pixels in each of the preceding and following base frames at which the multiplicity of use of pixel color values is greater than one and that coincides with an edge.

In Example 27, which includes the subject matter of any of Examples 18-26, the method may include determining a criterion value for the preceding base frame from a sum of the first quantity and the second quantity of the preceding base frame, determining a criterion value for the following base frame from a sum of the first quantity and the second quantity of the following base frame, and comparing the greater of the criterion value of the preceding base frame and the criterion value of the following base frame to the threshold to determine whether to insert the interpolated frame between the preceding base frame and the following base frame.

In Example 28, which includes the subject matter of any of Examples 18-27, the method may include at least one of visually presenting frames of the up-converted video stream or transmitting up-converted video data including the up-converted video stream to a display device via a network following up-conversion of the base video stream to generate the up-converted video stream, the base video stream and the up-converted video stream representing a motion video In Example 29, at least one machine-readable storage medium includes instructions that when executed by a computing device, cause the computing device to analyze a pair of temporally adjacent base frames of a base video stream and at least one motion vector associated with movement of an object between a preceding base frame and a following base frame of the pair of base frames to determine a degree of visual artifacts involving an edge of the object in an interpolated frame derived from the pair of base frames and the at least one motion vector, and selectively insert the interpolated frame between the preceding base frame and the following base frame to up-convert a frame rate of the base video stream to generate an up-converted video stream based on a comparison of the degree of visual artifacts to a threshold, In Example 30, which includes the subject matter of Example 29, the computing device may be caused to selectively insert a copy of one of the preceding base frame and the following base frame between the preceding base frame and the following base frame instead of the interpolated frame based on the comparison.

In Example 31, which includes the subject matter of any of Examples 29-30, the computing device may be caused to analyze the preceding base frame and the following base frame to generate the at least one motion vector.

In Example 32, which includes the subject matter of any of Examples 29-31, the computing device may be caused to analyze the preceding base frame and the following base frame to determine locations of edges in each.

In Example 33, which includes the subject matter of any of Examples 29-32, the computing device may be caused to analyze at least the at least one motion vector to determine locations of pixels in each of the preceding and following base frames at which a multiplicity of use of a pixel color value in determining a pixel color value of the interpolated frame is other than one.

In Example 34, which includes the subject matter of any of Examples 29-33, the computing device may be caused to determine a first quantity of pixels in each of the preceding and following base frames at which the multiplicity of use of pixel color values is zero and that coincides with an edge, and determine a second quantity of pixels in each of the preceding and following base frames at which the multiplicity of use of pixel color values is greater than one and that coincides with an edge.

In Example 35, which includes the subject matter of any of Examples 29-34, the computing device may be caused to determine a criterion value for the preceding base frame from a sum of the first quantity and the second quantity of the preceding base frame, determine a criterion value for the following base frame from a sum of the first quantity and the second quantity of the following base frame, and compare the greater of the criterion value of the preceding base frame and the criterion value of the following base frame to the threshold to determine whether to insert the interpolated frame between the preceding base frame and the following base frame.

In Example 36, which includes the subject matter of any of Examples 29-35, the computing device may be caused to multiply the first quantity of each of the preceding and following base frames by a first factor, and multiply the second quantity of each of the preceding and following base frames by a second factor to control the relative weighting of the first and second quantities in determining the criterion values for each of the preceding and following base frames.

In Example 37, which includes the subject matter of any of Examples 29-36, the computing device may be caused to divide the criterion value of the preceding base frame by a quantity of pixels of the preceding base frame at a location coinciding with an edge, and divide the criterion value of the following base frame by a quantity of pixels of the following base frame at a location coinciding with an edge.

In Example 38, which includes the subject matter of any of Examples 29-37, the computing device may be caused to transmit up-converted video data including the up-converted video stream to a display device following via a network following up-conversion of the base video stream to generate the up-converted video stream, the base video stream and the up-converted video stream representing a motion video.

In Example 39, at least one machine-readable storage medium may include instructions that when executed by a computing device, cause the computing device to perform any of the above.

In Example 40, a device to up-convert a motion video frame rate may include means for performing any of the above.

The invention claimed is:

1. A device to up-convert a motion video frame rate comprising:
 a processor circuit; and
 a memory storing instructions which when executed by
  the processor circuit cause the processor circuit to:

receive a pair of temporally adjacent base frames of a base video stream, the base frames comprising a preceding base frame and a following base frame;

analyze a motion vector associated with movement of an object between the preceding base frame and the following base frame to determine a degree of visual artifacts involving an edge of the object in an interpolated frame based on a first criterion value and a second criterion value for the preceding base frame, the first criterion value corresponding to a count of pixels of the edge of the object in the preceding base frame having color values not used in determining color values for pixels in the interpolated frame, the second criterion value corresponding to a count of pixels of the edge of the object in the preceding base frame having color values used to determine color values for more than one pixel in the interpolated frame; and select the interpolated frame for insertion between the preceding base frame and the following base frame in up-converting a frame rate of the base video stream to generate an up-converted video stream based on at least one of the first and second criterion values exceeding a threshold.

2. The device of claim 1, the memory storing instructions which when executed by the processor circuit cause the processor circuit to selectively insert a copy of one of the preceding base frame and the following base frame between the preceding base frame and the following base frame instead of the interpolated frame based on a determination that the first and second criterion values do not exceed the threshold.

3. The device of claim 1, the memory storing instructions which when executed by the processor circuit cause the processor circuit to:

determine the first criterion value and the second criterion value for the following base frame; and select the interpolated frame for insertion between the preceding base frame and the following base frame based on at least one of the first and second criterion values for the following base frame exceeding the threshold.

4. The device of claim 3, the memory storing instructions which when executed by the processor circuit cause the processor circuit to:

multiply the first criterion values for the preceding base frame and the following base frame by a first factor;

multiply the second criterion values for the preceding base frame and the following base frame by a second factor;

compute a respective sum of the multiplied first criterion values and the multiplied second criterion values for the preceding base frame and the following base frame:

divide the sum for the preceding base frame by a count of pixels in the preceding base frame depicting an edge to determine a modified criterion value for the preceding base frame; and divide the sum for the following base frame by a count of pixels in the following base frame depicting an edge to determine a modified criterion value for the following base frame.

5. The device of claim 4, the memory storing instructions which when executed by the processor circuit cause the processor circuit to select the interpolated frame for insertion between the preceding base frame and the following base frame by:

compare the modified criterion values of the preceding base frame and the following base frame to identify a greater one of the modified criterion values; and determine that the greater one of the modified criterion values exceeds the threshold.

6. The device of claim 5, the threshold corresponding to an amount of distraction of a human visual system (HVS) introduced by the visual artifacts.

7. The device of claim 1, comprising at least one of a display to visually present frames of the up-converted video stream or an interface to transmit up-converted video data comprising the up-converted video stream to a display device via a network following up-conversion of the base video stream to generate the up-converted video stream, the base video stream and the up-converted video stream representing a motion video.

* * * * *